United States Patent
Mital et al.

(10) Patent No.: US 8,510,288 B2
(45) Date of Patent: Aug. 13, 2013

(54) APPLYING ANALYTIC PATTERNS TO DATA

(75) Inventors: Vijay Mital, Kirkland, WA (US); Darryl Ellis Rubin, Duvall, WA (US); David G. Green, Redmond, WA (US); John A. Payne, Seattle, WA (US); Suraj T. Poozhiyil, Redmond, WA (US); Ahmad Nizam Anuar, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 112 days.

(21) Appl. No.: 12/963,553

(22) Filed: Dec. 8, 2010

(65) Prior Publication Data

US 2012/0102074 A1 Apr. 26, 2012

Related U.S. Application Data

(60) Provisional application No. 61/405,908, filed on Oct. 22, 2010.

(51) Int. Cl.
G06F 7/00 (2006.01)

(52) U.S. Cl.
USPC .......................................... 707/708

(58) Field of Classification Search
USPC .......................................... 707/708
See application file for complete search history.

(56) References Cited

U.S. PATENT DOCUMENTS

| | | | |
|---|---|---|---|
| 7,788,064 | B1 | 8/2010 | Hao et al. |
| 2005/0177790 | A1 | 8/2005 | Molander et al. |
| 2006/0271537 | A1* | 11/2006 | Chandrasekharan et al. .... 707/7 |
| 2007/0171716 | A1 | 7/2007 | Wright et al. |
| 2007/0244910 | A1 | 10/2007 | Mital et al. |
| 2009/0326885 | A1 | 12/2009 | Rubin et al. |
| 2011/0161137 | A1* | 6/2011 | Ubalde et al. ............... 705/7.34 |

OTHER PUBLICATIONS

Knowledge Visualization Using Optimized General Logic Diagrams—Published Date: 2005 http://u2.gmu.edu:8080/dspace/bitstream/1920/1492/2/05-03.pdf.
Performance Point Services Glossary—Retrieved Date: Sep. 9, 2010 http://technet.microsoft.com/fr-fr/library/bb838764.aspx.
Analytic Development Environments—Retrieved Date: Sep. 9, 2010 http://tdwi.org/pages/misc/columns/analytic-development-environments.aspx.

* cited by examiner

*Primary Examiner* — Truong Vo

(57) ABSTRACT

Aspects described relate to analyzing data at a high level of abstraction. "Smarts," incorporating one or more analytic patterns, may be applied to data sources. These Smarts may be in the form of at least one of an equation, rule, constraint or expression to generate a result from applying the analytic pattern to the data. Smarts may be pre-defined and selected from a library based on user preference and the data input. Any suitable user interface may be used to apply analytic pattern(s) to items of data as well as provide a visual environment for a user to make intuitive adjustments to the data, add controls in the user interface to filter or constrain the data, or combinations thereof, resulting in one or more modified results.

20 Claims, 19 Drawing Sheets

APPLYING ANALYTIC PATTERNS TO DATA

REFERENCE TO RELATED APPLICATION

This application is entitled to the right of priority and claims the benefit of the filing date of U.S. provisional application having Ser. No. 61/405,908 and entitled "APPLYING ANALYTIC PATTERNS TO DATA", filed on Oct. 22, 2010. The entire teachings of the above referenced provisional application are hereby incorporated by reference in its entirety.

BACKGROUND

Today, people are regularly exposed to large amounts of data and often seek to manipulate such data in a number of ways. Computing environments provide the ability for users to analyze such large amounts of data. In some cases, data is manipulated graphically through a visually interactive user display.

Data may be imported, for example, into a spreadsheet where a user is able to process expressions of data according to a variety of functions. For instance, cells in a spreadsheet can contain expressions in the form of item(s) of data and/or functions that may be employed as operations on data. An expression can refer to other cells in a spreadsheet as inputs to the expression, such that a value computed for a first cell may depend on values contained within other cells. In such cases, the result of an evaluation of an expression in the form of a function can be presented in the same cell as the expression.

Data in a spreadsheet can also be presented through a chart or graph created if the spreadsheet program supports such a capability.

SUMMARY

Aspects relate to analysis of data at an abstract level that is beyond that of the capability of spreadsheet environments. In various embodiments, one or more analytic patterns may be captured in reusable components that can be applied to data to provide a user with the ability to use complex analytic logic in forming a solution via a visual interface. These components, called "Smarts," can be available to a user as pre-packaged components, for example in a library. A Smart may include at least one of an equation, rule, constraint or expression that represents the analytic pattern. In operation, inputs of the Smart may be connected to sources of data to be analyzed and the Smart may then be executed. A result of such execution may be presented directly to a user or may impact the data being analyzed or presented to the user by other components.

Use of Smarts allows any of a number of analytic patterns to be selected and applied to a data set. In some embodiments, an analytic pattern may be applied to a data set to create an ensemble of items out of the data set. Alternatively, an analytic pattern may select data or derive values to minimize or maximize certain criteria. For example, the analytic pattern may function to identify a site represented in a data set to minimize a distance a particular site of interest is from other locations. Or, the analytic pattern may maximize the merit involved in consideration of certain decisions or possibilities. In some embodiments, an analytic pattern applied to a data set proposes an arrangement of events to occur based on a certain sequence or at particular times. As these examples illustrate, the result of execution of a Smart may be in any suitable form, including non-scalar forms.

A computing device may provide a user interface for a user to input a selection of a Smart that encodes an analytic pattern. Having selected the Smart, the user may also specify a source of data for connecting a data set to the Smart, which then performs an operation on the data based on the analytic pattern associated with the Smart to produce an output. After receiving an indication of the output, a user may provide an additional input that updates an aspect of the analytic pattern and/or the data to produce a modified result. In some embodiments, the user interface may provide an interactive visualization for the user to make suitable adjustments to items of data, the analytic pattern, or a combination thereof.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
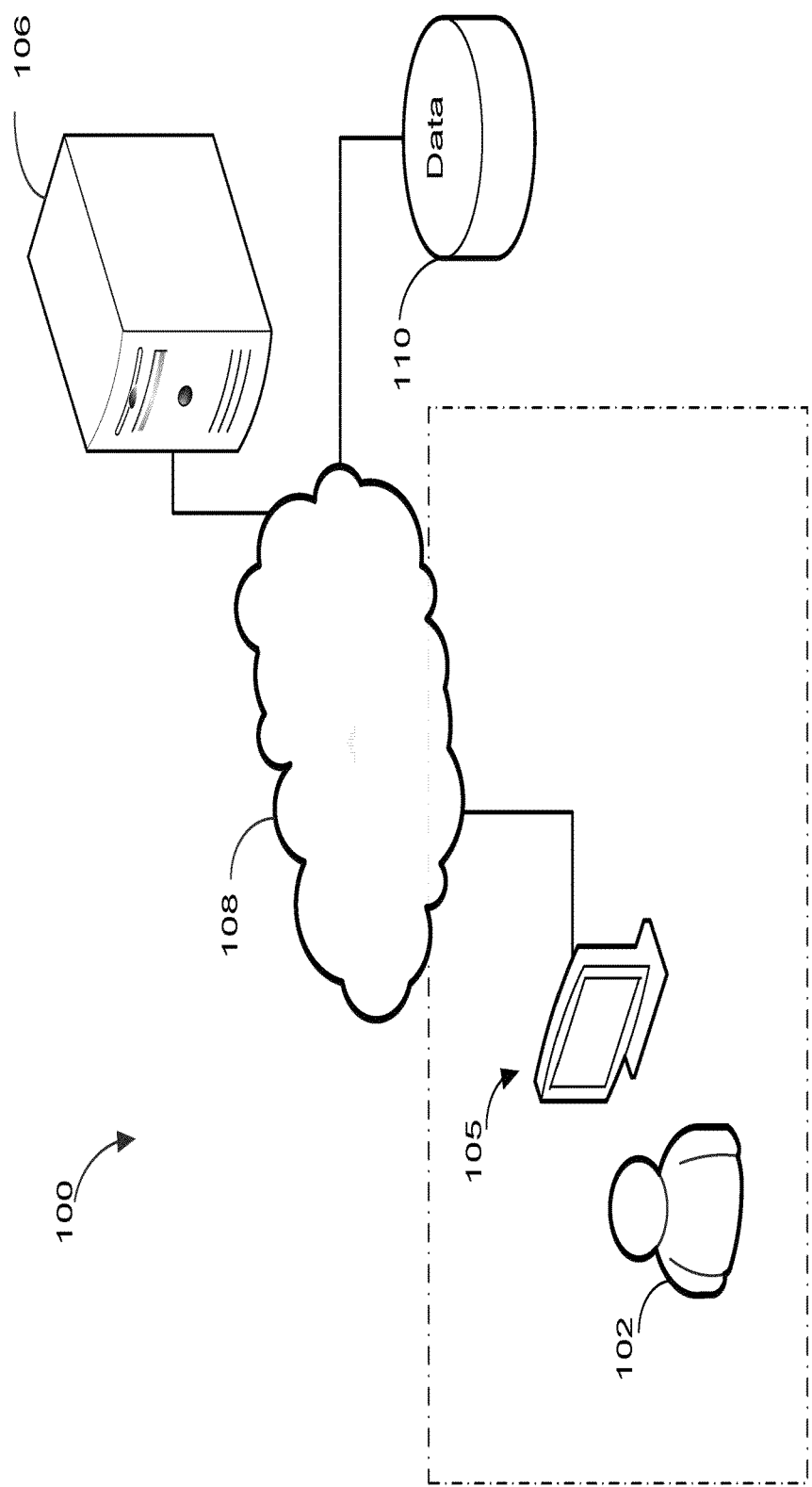
FIG. 1 is a high-level block diagram illustrating a computing environment in which some embodiments may be practiced.

The inventors have recognized and appreciated that conventional computing environments (e.g., spreadsheet) are not able to provide analysis of data in ways that meet the needs of modern information workers. Aspects described herein employ analytic patterns that enable users to apply complex analytic logic in a visually interactive manner to data sets in a manner that is intuitive, adjustable and reusable. Using analytic patterns described to analyze and evaluate data may, in some cases, insulate a user from complexities involved in creating multiple functions and/or connections of data.

In some embodiments, a user interface may be provided for analyzing a data set containing a number of items. The user interface may provide an environment for the data to be visualized and manipulated through an interactive setting. Application of analytic pattern(s) contained within Smart components may facilitate such analysis. In some embodiments, the Smarts may be implemented as declarative models that contain one or more constraints, equations or rules that operate on items in a data set and may be suitably and dynamically visualized.

For example, a Smart may operate on a set of real estate data and, when executed, provide an interactive tour of potential sites selected with a goal of displaying sites suitable for starting a business according to interests provided by a user. Or, another Smart may allow a user to visualize how the distribution of types of businesses in a particular neighborhood will vary when the percentage of another type of business changes. Accordingly, application of one or more analytic patterns may result in a visualization of data that provides for a highly interactive and intuitive user experience.

Smarts may be pre-packaged and available through a user interface for a user to select. Smarts may have pre-defined analytic patterns. However, in some embodiments, a user may create a Smart application component having a suitable analytic pattern to which data is input and a result produced based on an evaluation of at least one of an equation, rule, constraint or expression. Based on the output resulting from the analytic pattern executed, a user may input one or more updates to the analytic pattern and/or the data where the analytic pattern is re-run to yield a modified result.

Though Smarts may be selected based on user inputs, the functionality and utility of data analysis systems may be expanded by incorporating into a computing system components that can select and apply one or more Smarts containing analytic patterns characterizing data to be provided to a user in the user's context, and also characterizing the interactions between the data and user. In response to an input identifying user context, the system may identify a Smart to apply in generating information for the user, and to handle further interactions between the user and the information (as the user seeks to better understand the information or subsets of the information, including by providing more data).

Once a Smart is selected, a Smart execution engine may apply the Smart to generate information. A Smart may include one or more elements, at least some of which define a computation to be performed based on data indicated as providing an input to the Smart. This information may be provided to a user through a display, though the results of execution of a Smart may be used in any suitable way, including influencing output generated by another component or altering a subset of data that has been selected for analysis.

In some embodiments, the computation may be based on an equation represented in the Smart. The equation may specify a mathematical operation to be performed on data that is dynamically identified by user input. Such a mathematical operation may include other data, such as user data obtained from a user profile or based on context information.

For example, a Smart may include an equation, defining computation of calorie content from a recipe. Such a Smart may be selected by a user, for example, when analyzing data representing recipes such that, in addition to receiving data representing these recipes, a user may receive calorie content. In some embodiments, a Smart may contain declarative statements that are conditionally executed. Such declarative statements, for example, may specify additional sources of information that may be accessed to apply an analytic pattern. For example, a Smart, when executed, may acquire data from which calorie content may be determined.

As another example, a Smart may include a formula for computing commuting distance or time from a location. Such a Smart may be selected by a user, for example, when analyzing data on houses for sale such that, in addition to receiving a listing of houses for sale, a user may receive commuting information for each house.

As yet another example, a Smart may include a formula for generating a metric comparing a patient's lab results to a population norm. Such a Smart may be selected by a user, for example, analyzing data obtained over an intranet in a hospital such that a clinician may receive, in addition to lab results for a patient, comparative data characterizing the results based on an analysis of lab results in medical records for other users treated in the facility. The Smart may enable the clinician to do what-ifs like change some assumptions about the patient or the relationship between lab data and underlying disease.

Besides equations and/or formulae, a Smart may also comprise other types of statements, such as constraints and/or rules. Also, the application of a Smart in a data analysis system may additionally or alternatively trigger other actions to be performed besides the generation of information to be returned to the user. Such actions may be conditionally performed based on satisfaction of a constraint in the Smart or based on the evaluation of a rule in the Smart.

A data analysis system may contain multiple Smarts, applicable in different contexts. Accordingly, a data analysis system may contain a component that selects a Smart for a specific context. A component to perform this function may access a Smart library, from which a user or component of the system may select one or more Smarts.

To facilitate the use of Smart, each analytic pattern in the Smart may be represented as a collection of declarative statements ("expressions").

An expression is a symbolic representation of a computation to be performed, which may comprise operators and operands. The operators of an expression may include any operators known to one of skill in the art (such as the common mathematical operators of addition, subtraction, multiplication, and division), any functions known to one of skill in the art, and functions defined by a user. The operands of an expression may include data (such as numbers or strings), symbols that represent data, and other expressions. An expression may thus be recursive in that an expression may be defined by other expressions.

A symbol may represent any type of data used in common programming languages or known to one of skill in the art. For example, a symbol may represent an integer, a rational number, a string, a Boolean, a sequence of data (potentially infinite), a tuple, or a record. In some embodiments, a symbol may also represent irrational numbers, while in other embodiments, symbols may not be able to represent irrational numbers.

For example, an expression may take the form of a symbolic representation of an algebraic expression, such at $x^2+2xy+y^2$, where x and y may be symbols that represent data or other expressions. An expression may take the form of an equation, such as $E=mc^2$, where E, m, and c may by symbols representing data or other expressions. An expression may take the form of a function definition, such as $f(x)=x^2-1$, where $f$ is a symbol representing the function, x is a symbol representing an operand or argument of the function, and $x^2-1$ is an expression that defines the function. An expression may also take the form of a function invocation, such as $f(3)$, which indicates that the function $f$ is to be invoked with an argument of 3.

Expressions may be solved by an execution engine 240 (shown in FIG. 2) to produce a result. For example, where the symbol x (itself an expression) represents the number 3 and the symbol y (also an expression) represents the number 2, the expression $x^2+2xy+y^2$ may be solved by replacing the symbols with the values the represent, e.g., $2^2+2\times2\times3+3^2$, and then applying the operators to the operands to solve the entire expression as 25. In another example, where m is a symbol representing the number 2 and c is a symbol representing the number 3, the expression E, defined above, may be solved by replacing E with its definition, e.g., $mc^2$, replacing the symbols m and c with the values they represent, e.g., $2\times3^2$, and applying the operators to the operands to solve the expression as 18.

In evaluating an expression, the execution engine may apply the operators to the operands to the extent that the operators and operands are defined and to the extent that expression engine knows how to apply the operators to the operands. For example, where the symbol x represents the number 3 and the symbol y is not defined, the expression $x^2+2xy+y^2$ may be solved by replacing the known symbols with the values the represent, e.g., $2^2+2\times2\times xy+y^2$, and then applying the operators to the operands to solve the entire expression as $4+4y+y^2$. Where the symbol x represents the number 3 and the symbol y represents the string "hello", the expression $x^2+2xy+y^2$ may be solved as $4+4\times hello+hello^2$, since the expression engine may not know how to perform arithmetic operations on the string "hello."

In some embodiments, expressions may be declarative. A declarative expression may indicate a computation to be performed without specifying how to compute it. A declarative expression may be contrasted with an imperative expression, which may provide an algorithm for a desired result.

In some embodiments, expressions may be immutable. An expression is immutable if it cannot be changed. For example, once a definition is given, such as $E=mc^2$, the expression E cannot later be given a different definition. One advantage of immutability is that applications defined by immutable expressions may be side-effect free in that the functionality of the application may not be able to be altered by users of the application.

A Smart may be defined by a set of expressions that collectively specify an analytic pattern. A Smart defined by expressions may have input variables and output variables and the relationship between the input variables and the output variables may be defined by the set of expressions. In solving for the output variables, the expression engine may produce data (e.g., a number or a string) or may produce an expression of the input variables.

In this way, the Smarts may be relatively easy to produce and apply. Further, by having Smarts applied in an execution engine, an entity providing Smarts execution services may receive Smarts from third parties and apply them in any suitable environment. Furthermore, by allowing in the data analysis system the contribution and application of Smarts from third parties, the data analysis system is able to leverage the expertise of subject matter experts who may have specific knowledge pertinent to particular types of data analyses.

To facilitate the authoring and contribution of Smarts by third parties, the data analysis system may provide an authoring tool with a user interface that allows an author to create a Smart. In some embodiments, Smarts are represented in a format that allows a user to simply create or edit a Smart by entering a set of declarative statements. The declarative statements may be in a format that would not require computer programming expertise. The authoring tool may execute in the data analysis system itself and/or on a client system.

In some embodiments, a Smart encoding an analytic pattern may include metadata that enables the system to generate a visual object that displays aspects of operation of the analytic pattern. The visual object may provide a display showing input of data to the Smart through a data connector. For example, an input to a connector of a Smart may be displayed on a user interface as an icon representing the data dragged over an icon representing the Smart indicating that the data is connected with the Smart. Or, the visual object may provide a display of a result arising from the Smart based on a evaluation of an equation, rule, constraint or expression representing the analytic pattern with the data. For example, the evaluation representing the analytic pattern operating on the data may be displayed according to each step of calculating that occurs in evaluating a rule, constraint and/or expression with respect to the data. Alternatively, the visual object may provide a display of any intermediate process steps that may occur between the input of data to the Smart and a result from the evaluation of the data according to features of the analytic pattern. A user may utilize an authoring model that binds or composes analytic patterns to visual objects, enabling the user to visualize the progression of steps that occur in the analytic pattern.

As a result, knowledge useful in generating data analysis results may be captured in Smarts and shared across data analysis systems.

FIG. 1 is a high level diagram illustrating a computing environment 100 in which some embodiments of the invention may be practiced. Computing environment 100 includes a user 102 interacting with a computing device 105. Computing device 105 may be any suitable computing device, such as a desktop computer, a laptop computer, a mobile phone, or a PDA. Computing device 105 may operate under any suitable computing architecture, and include any suitable operating system, such as variants of the WINDOWS® Operating System developed by MICROSOFT® Corporation.

Computing device 105 may have the capability to communicate over any suitable wired or wireless communications medium to a server 106. The communication between computing device 105 and server 106 may be over computer network(s) 108, which may be any suitable number or type of telecommunications networks, such as the Internet, a corporate intranet, or cellular networks. Server 106 may be implemented using any suitable computing architecture, and may configured with any suitable operating system, such as variants of the WINDOWS® Operating System developed by MICROSOFT® Corporation. Moreover, while server 106 is illustrated in FIG. 1 as being a single computer, it may be any suitable number of computers configured to operate as a coherent system. Computing device 105 may also have access to any suitable source of data 110.

In the embodiment of FIG. 1, a data analysis system may execute on server 106, and computer 105 may provide a user interface through which a user may enter inputs and receive results. However, there is no requirement that the data analysis system execute on a server and it may, for example, execute wholly on computer 105.

Regardless of the type of input provided by user 102 that triggers generation of an input, computing device 105 may send the input to server 106 to obtain information relevant to the input. That information may be obtained from one or more data sets stored in database 110 which is also accessible over network 100. As part of retrieving or generating data relevant to the input, server 106 may apply one or more declarative analytic patterns to the data to generate higher level information to be returned to user 102. The information generated by server 106 may be sent over computer network(s) 108 and be displayed on a display of computing device 105. A display may be any suitable display, including an LCD or CRT display, and may be either internal or external to computing device 105.

Server 106 may implement an environment in which a user may interactively specify analysis functions to be performed on one or more data sets. Such an environment may be regarded as an analysis workbench. In the system diagram of FIG. 2, the analytic workbench may provide a library of Smarts 200 that may be selected by a user to perform one or more data processing operations. Examples of Smarts include ensembling Smart 202, distance minimization Smart 204, plan generation Smart 206, schedule generation Smart 208 and merit maximization Smart 210. However, it can be appreciated that any suitable Smart having an analytic pattern 212 can be defined. In the embodiment illustrated, each Smart may be defined by an appropriate combination of equations, rules, constraints and/or expressions.

Smarts may be pre-programmed and downloaded or user derived, and selected for use on the analytic workbench. In some embodiments, Smarts are programmed by a user or downloaded from a server on to a computing device. Depending on the type of task involved, an appropriately defined Smart may be selected from the library 200. For example, in proposing a suggested arrangement of articles of clothing, an analytic pattern for creating an ensemble 202 may be most appropriate. Or, an analytic pattern for generating a schedule 208 may be appropriately employed for creating a planned sequence of events to take place at particular times.

Once chosen, a selected Smart 220 may have suitable data connectors that indicate a source of data to supply values of input parameters of the Smart. Data connectors may also specify, in some cases, a routing of output data generated by execution of a Smart. For example, an input connection 222 for data to be accessible by the Smart and an output connection 224 for the analytic pattern(s) to be applied to the data and to generate an output result are illustrated. The Smart may be connected to a suitable data source 230, such as a particular database, data set within a database or certain portions of a spreadsheet holding data, through the input connection 222.

The analytic pattern(s) of the Smart are applied to the data input through an execution engine 240, providing an output result that may influence display model 250 by adding to or altering display subset 252. Here, display subset 252 represents a set of data derived by analysis of a data set. The subset 252 may be a subset of the items in data source 250 or may contain items or values generated from analysis of data in the data source. Display subset 252 may be the data used and display of analysis results to be viewed by a user. Based on the output results displayed, a user may provide input feedback through a user interface 260 to further analyze the data, which may result in altering or augmenting the display subset, which may in turn alter what is displayed to the user. Such further analysis may be performed by supplying the input to the selected Smart to update aspects of either the data input and/or the analytic pattern(s), for an updated result to be generated. For example, a user may update the data input to the selected Smart from the data source 230 itself, resulting in a modified display subset 252. Other tools 270 may also be applied to the display subset 252 independent from the selected Smart. In some embodiments, based on the output results generated from the execution engine 240 and/or provided to the display model 250, an updated input can be automatically provided to the selected Smart 220 for a modified result to be produced, without user intervention. Accordingly, a final output can be generated by the selected Smart 220 through an iterative process.

Figure 2:
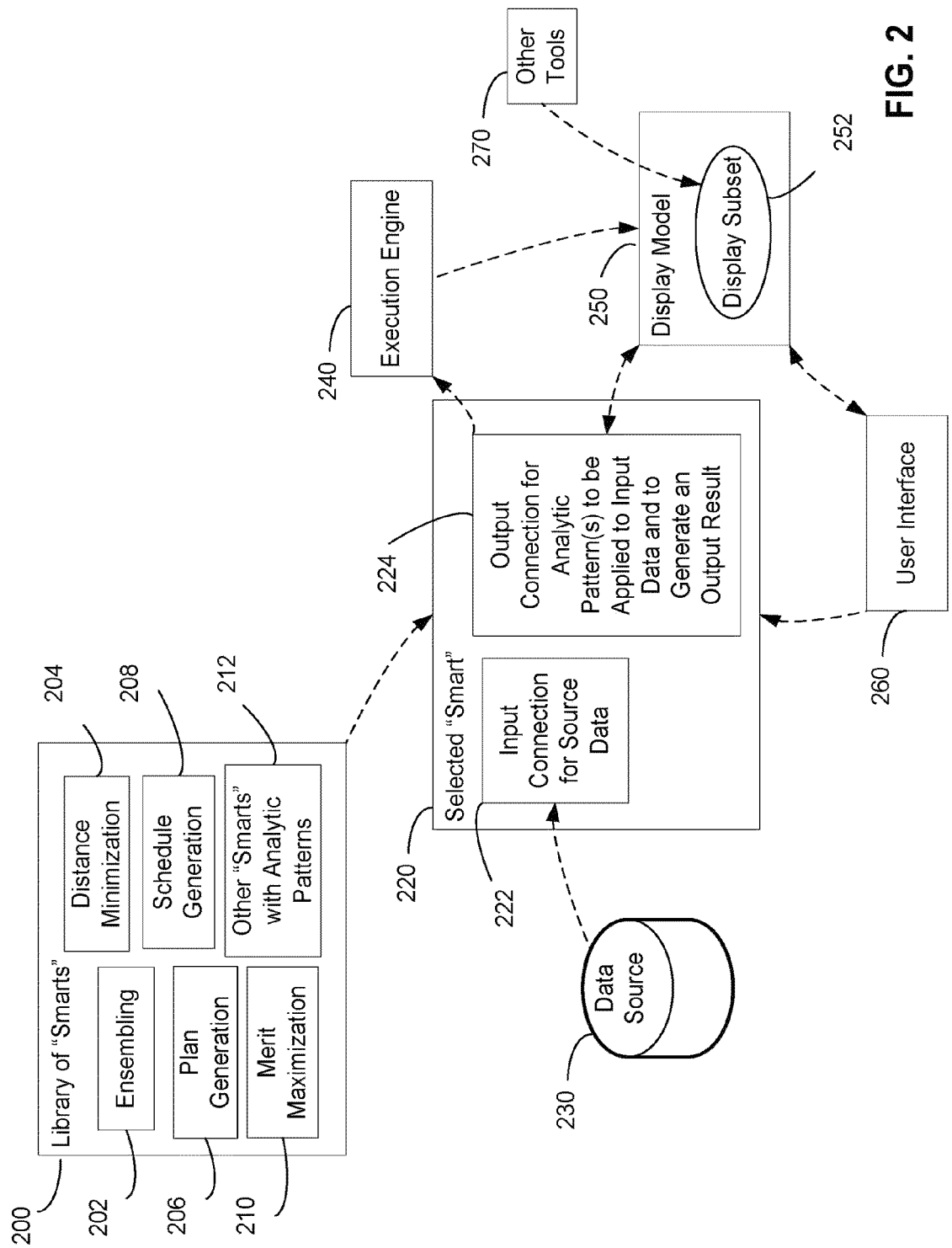
FIG. 2 is a schematic diagram of a system for applying an analytic pattern to a data set according to some embodiments.
Figure 3:
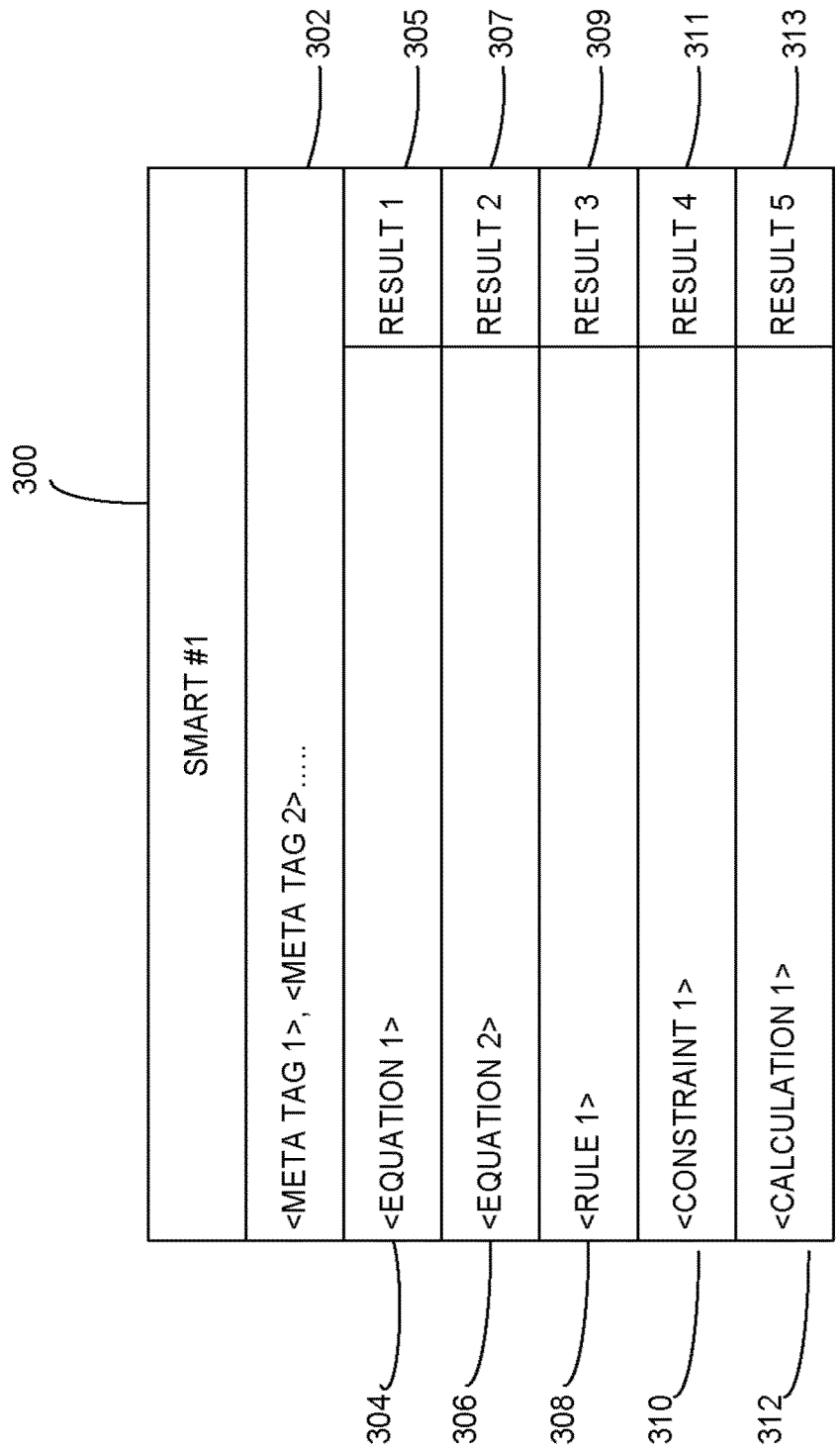
FIG. 3 is a diagram of types of statements that may comprise the specification of a declarative model defining a Smart.

FIG. 3 is a sketch of a data structure that may be used to define a Smart 300, such as one selected from a library of Smarts 200 of FIG. 2. Smart 300 may be stored in any suitable way. In some embodiments, it may be stored in a file. Accordingly, in such embodiments, like other web pages, Smart 300 may include meta tags 302 to aid in indexing the smart in any suitable way.

Smart 300 may comprise one or more elements, which in the embodiment illustrated are statements in a declarative language. In some embodiments, the declarative language may be at a level that a human being who is not a computer programmer could understand and author. For example, it may contain statements of equations and the form of a result based on evaluation of the equation, such as equation 304 and result 305, and equation 306 and result 307. An equation may be a symbolic or mathematical computation over a set of input data.

Smart 300 may also comprise statement(s) of one or more rules, such as rule 308 and the form of a result based on evaluation of the equation, such as rule result 309. The application of some types of rules may trigger an action, such as having a search to be performed, thereby collecting new information or displaying a result in a specified graphical format. According to some embodiments, when an analytic pattern of a Smart 300 containing a rule, such as rule 308, is applied, such as by execution engine 240, the evaluation of the rule performed as part of the application of the Smart may generate a suitable result. For example, a rule may be a conditional statement and a result that applies, depending on whether the condition evaluated dynamically is true or false. Accordingly, the result portion of a rule may specify actions to be conditionally performed or information to be displayed or any other type of information.

Smart 300 may also comprise statement(s) of one or more constraints, such as constraint 310 and result 311. A constraint may define a restriction that is applied to one or more values produced on application of the Smart. An example of a constraint may be an inequality statement such as an indication that the result of applying a Smart to data input 222. A result 311 may similarly be associated with constraint 310 to define an action conditionally taken or a result displayed based on evaluation of the constraint.

Smart 300 may also include statements of one or more calculations to be performed over input data, such as calculation 312. Each calculation may also have an associated result, such as result 313. In this example, the result may label the result of the specified calculation 312 such that it may be referenced in other statements within Smart 300 or otherwise specifying how the result of the computation may be further applied in generating information for a user. Calculation 312 may be an expression representing a numerical calculation with a numerical value as a result, or any other suitable type of calculation, such as symbolic calculations. In applying Smart 300 to data input 222, execution engine 240 may perform any calculations over data 222 that are specified in the analytic pattern, including attempting to solve equations, inequalities and constraints over the data input 222. In some embodiments, the statements representing equations, rules, constraints or calculations within an analytic pattern of a Smart may be interrelated, such that information generated as a result of one statement may be referenced in another statement within Smart 300. In such a scenario, applying Smart 300 may entail determining an order in which the statements are evaluated such that all statements may be consistently applied. In some embodiments, applying a Smart may entail multiple iterations during which only those statements for which values of all parameters in the statement are available are applied. As application of some statements generates values used to apply other statements, those other statements may be evaluated in successive iterations. If application of a statement in an iteration changes the value of a parameter used in applying another statement, the other statement will again be applied based on the changed values of the parameters on which it relies. Application of the statements in a Smart may continue iteratively in this fashion until a consistent result of applying all statements in the Smart occurs from one iteration to the next, achieving a stable and consistent result. Though, it should be recognized that any suitable technique may be used to apply a Smart 300.

Figure 4:
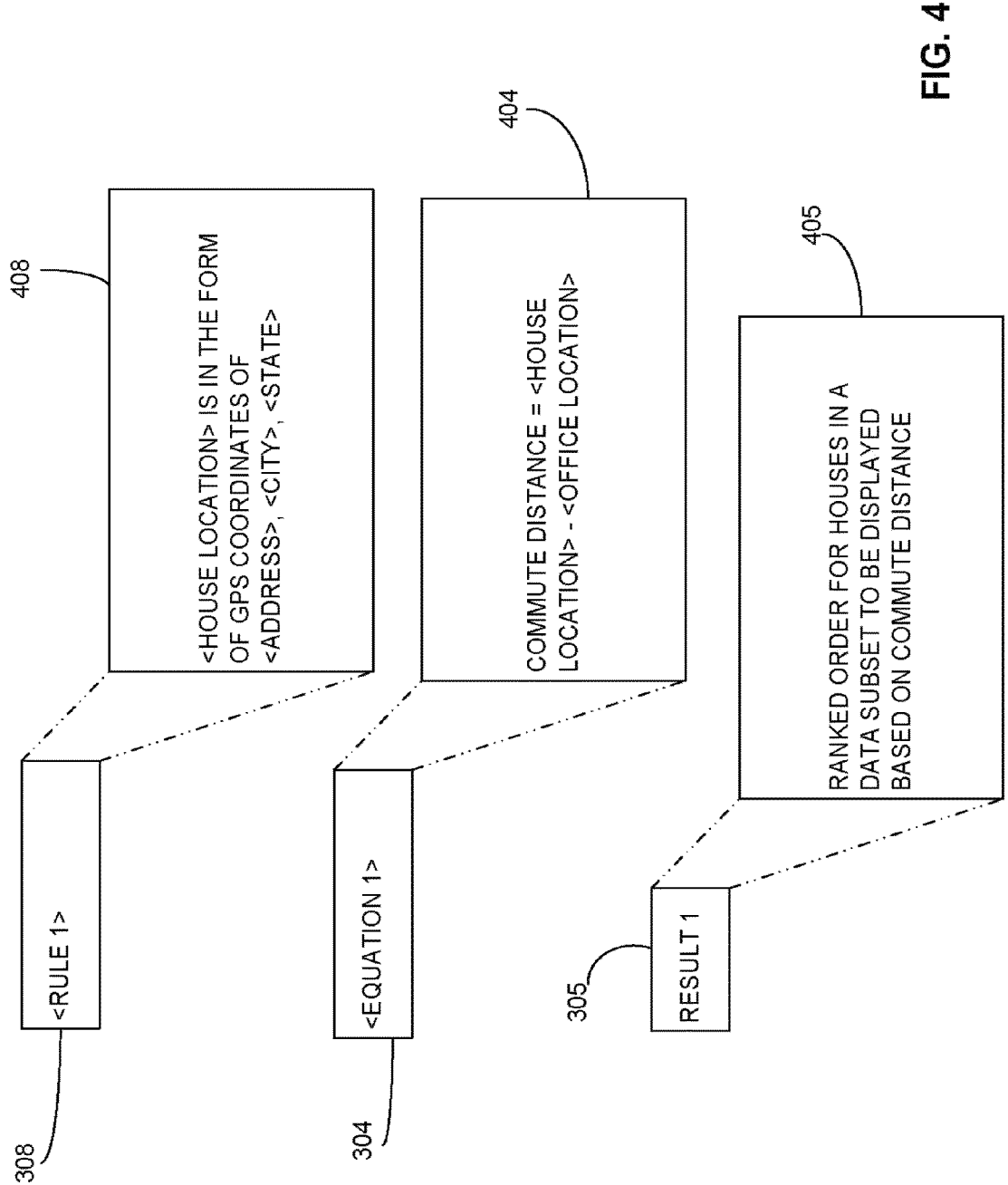
FIG. 4 is a diagram of an example of statements, such as those that may be specified for the declarative model of FIG. 3.

FIG. 4 provides an example of statements such as those that may be specified for Smart 300. In the example of FIG. 4, the Smart may be selected and applied when a user is performing a house search, and may in this example, relate houses for sale to the user's commute. Application of the Smart in the example of FIG. 4 may generate information on the commuting distance and/or time between each house for sale and the user's office location. Thus, rule statement 408 is an example of rule 308 from FIG. 3 that specifies the form of a house location to be used as part of the analytic pattern computations. In this example, rule statement 408 specifies that a parameter, identified as a house location, be in the form of global positioning system (GPS) coordinates of the address, city and state of the house for sale. These parameters may, when the Smart is applied, be given values by execution engine 240 based on input data 222. In this example, rule 308 may evaluate to true when an item of input data contains information that is recognized as a house location by application of rule 308. Accordingly, rule 308 may be used to identify items of data for which other statements within the Smart are applied.

Equation statement 404 is an example of equation 304 of FIG. 3 that provides a computation to be performed to arrive at the commute distance, based on the location of the house for sale as specified in rule statement 408 and a value that may be available to execution engine 240, which in this example is indicated as the office location. In this example, the office location is an input parameter to the model that may have been provided as part of a user profile or user context. The house location, however, is based on the application of rule statement 408, received from another input to the Smart, such as data from data source 230.

Result statement 405 is an example of result 305 of FIG. 3 that specifies how to display the result of the computation performed for equation statement 404. Thus, result statement 405, in this example, specifies a ranked order of priority for houses in a data subset to be displayed based on a commute distance, which is a parameter for which a value may be established based on data input 222.

The example of FIG. 4 illustrates some of the statements that may be present in a Smart to display results from a user query. In this example, the results relate to houses for sale. The Smart may be applied by execution engine 240 to every item of data in input data 222. Though, not every input item of data may comply with rule 308 or other conditions established by statements within the Smart. Accordingly, not every item of retrieved data 208 may be included in the display subset 252. Though, FIG. 4 illustrates that other information, not expressly included within input data 222, may be included in or otherwise influence the content of display subset 252. In the simple example of FIG. 4, a value of a parameter called "commute distance" is computed by execution engine 240 upon application of the Smart of FIG. 4.

Though, it is not a requirement that a Smart produce a numeric output. For example, a Smart component having an analytic pattern encoded therein may produce an ensemble of data according to a set of equations, declarative models, rules and/or constraints. In an embodiment, it may be desirable to generate a number of suggestions to complement a particular item, for example, articles that go with a flat screen television in creating a home theater environment. As such, a user may select an appropriate Smart that takes as input a large data set of potential articles for a home theater (e.g., obtained through a web search or read from a database). Once the data set is connected to the Smart, an execute engine may apply an analytic pattern reflected by the Smart to process the data and generate suggestions to the user for appropriate items that complement the flat screen television of interest to be acquired. For example, the Smart, having employed the analytic pattern, may identify one or more supplemental home theater devices, such as a recording device or sound amplification system. As a result, the home theater devices, in combination, may produce an appropriate ensemble of items to accompany the flat screen television. In some cases, various factors, such as price range, items the user already has, space available for the home theater set, and/or other appropriate considerations may be inputs connected to the Smart and are figured into the calculus of the analytic pattern.

In some embodiments, an analytic pattern of another Smart component may process a data set input according to a set of equations, declarative models, rules and/or constraints to result in a minimization of one or more characteristics of the data set, suiting a particular set of user preferences. In one embodiment, a user looking for a place to live may have a number of preferences, for example, a location or type of place. For instance, a user may prefer to live in close proximity to a place of work, school or a gym. In addition, the user may have a preference for particular locations he/she would like to visit in accordance with a particular sequence (e.g., a preference to leave home to go to work, school, and subsequently the gym, in that order). Accordingly, based on information connected to the selected Smart component of the available places of residence in a town or neighborhood, application of the analytic pattern in the Smart may generate a ranked list of proposed residences that are located a minimal distance from user-preferred places. Or, application of an analytic pattern of a different selected Smart may prioritize a number of potential places of residence for a user having a preference for the user to minimize his/her carbon impact on the environment, ahead of cost considerations. Accordingly, execution of the Smart may generate a ranked list containing potential homes within walking distance from certain locations of importance (e.g., work, school, gym), over those within driving distance. This ranked list may be provided to a user as an output or may be further used in defining an output. Based on the ranked list of potential homes, for example, the analytic workbench may produce and propose a map for display through a user interface to a user of a plurality of potentially desirable locations for the user to live. For example, when a user seeks to analyze housing data for a neighborhood where a number of potentially desirable homes are located, the user interface may take the user on a visually interactive "tour" of what places the user should consider, in accordance with the applied analytic pattern of a Smart.

In some embodiments, the analytic pattern of a selected Smart component may be implemented as a set of equations, declarative models, rules and/or constraints to generate a proposed plan or schedule of events to occur. For example, where a data set input into the Smart component includes items that represent a number of action items and/or future events, an applied analytic pattern may output an appropriate sequence for the items or events to be performed. Or, in an embodiment, an analytic pattern may generate an output of a proposed schedule of events to occur at specified times.

In some embodiments, an analytic pattern of a selected Smart component may maximize a score representing the merit of a collection of items in a data set. This analytic pattern may be represented as a set of equations, declarative models, rules and/or constraints. As an example, the shuttle launch agency of NASA may require decisions to be made regarding which satellites are to be launched and in what order over a 5 year period. A number of factors may figure into such a plan, for example, scheduling reasons for why launches would be required to occur at particular times. Other factors may also be considered such as the social and/or political impact of such launches. For example, a launch that occurs at a certain time and in a manner which permits astronauts from multiple countries to participate in a joint mission may be a political concern considered through an applied analytic pattern. In some cases, an opportunity for astronauts of different nationalities to cooperate may result in social and/or political benefits that is captured in an analytic pattern of a Smart to influence analysis of data.

As another example, a user may wish to create a solution for putting together a clothing ensemble or outfit that is in accordance with the latest fashion styles, price and/or other constraints or rules. The clothing ensemble may be assembled from a listing of articles of clothing, for example, those available in a department store. Data on such articles may be acquired from a suitable data source. Using conventional single-valued functions, such as those provided in a spreadsheet environment, to assemble a suitable clothing ensemble may be laborious and difficult for a user to employ, much less visualize through an interactive experience. However, analytic patterns described using Smarts may create a user experience that enables a user, for example, to be presented with a number of visual options for a clothing ensemble in accordance preferences that the user may have. Accordingly, a user may, on a user interface, select a Smart component having an analytic pattern that connects a data set that represents a large number of articles of clothing as an input to the selected Smart. Through processing of the analytic pattern on the data input, one or more proposed arrangements may be identified and presented to the user through a graphical interface of an analytic workbench. A user may then conveniently adjust the values of parameters that are coupled to inputs of the Smart. Alternatively or additionally, the user may involve other analysis functions that change the subset of data on which analysis is based. For example, a user may specify one or more constraints on that data. For example, a constraint may restrict the data subset to only contain items in a defined price range. As the values of inputs to the Smart change, the Smart may be re-executed. Accordingly, the analytic pattern of the Smart may be applied at levels of abstraction that require multiple parameters and relationships of parameters to be changed simultaneously.

A software application, implementing an analytic workbench, may provide a suitable interface for a user to appropriately select Smart components from a library of Smarts. The user may then specify the type of data to be input into the Smart such that the analytic pattern can appropriately process the data and generate a result. Such a result may be displayed through the user interface, and feedback of the result may be easily and conveniently provided.

Any number of analytic patterns may be selected and applied to data in any combination and may be applied in conjunction with other analysis tools. Such analytic patterns may be pre-packaged as Smarts components for a user to select. The pre-packaged Smarts may be applied to a specific analysis problem by receiving user input indicating what data is input to the Smart and how an output generated may influence a presentation of results to the user through an appropriate display interface.

Figure 5:
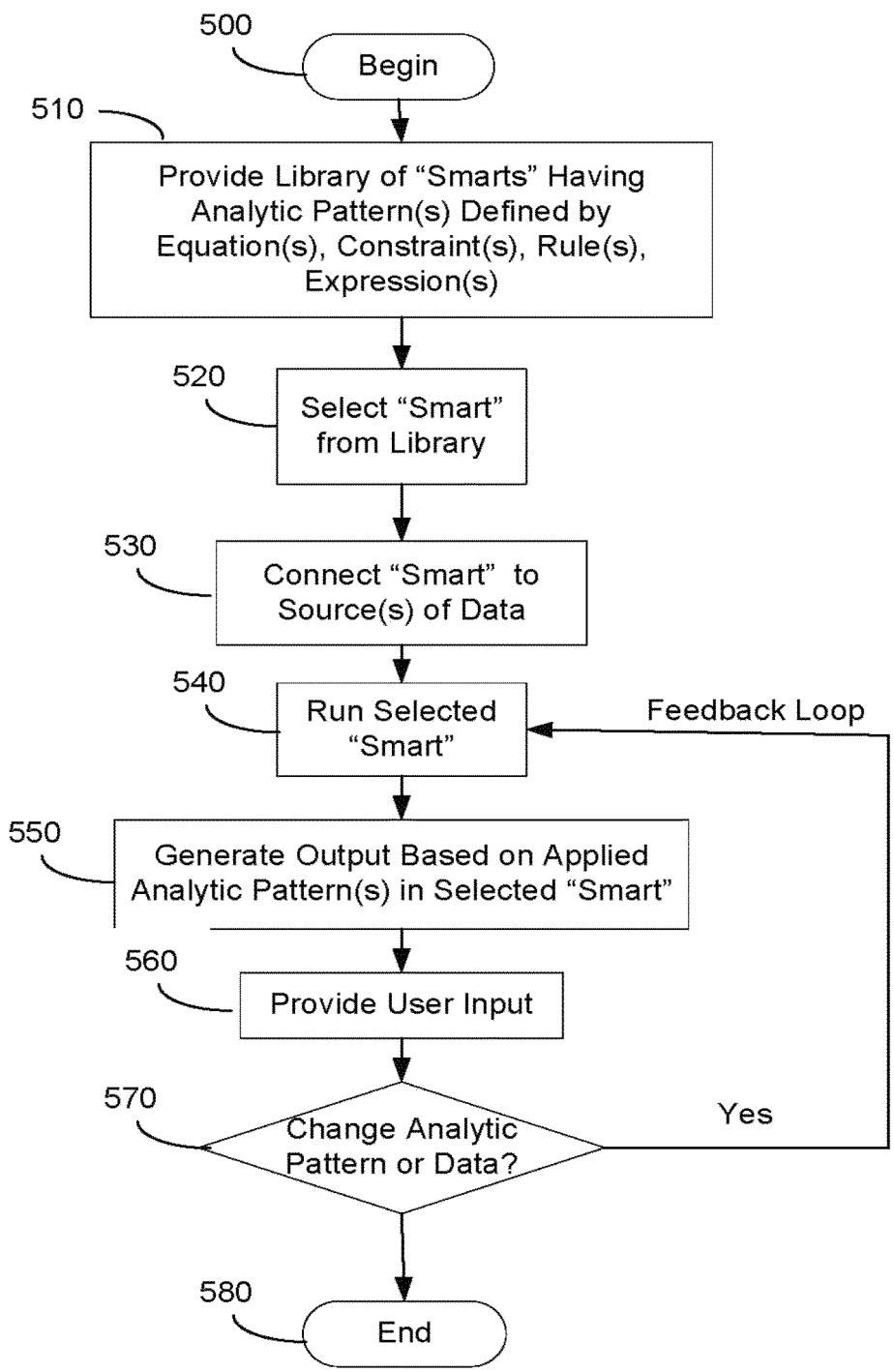
FIG. 5 is a flow chart of an embodiment for analyzing data using a Smart.

FIG. 5 represents a flow chart of a process for using a Smart to analyze and evaluate data. The process begins in step 500, and in step 510, the system may provide a library of Smarts having one or more analytic patterns, which for example may be defined by one or more equations, constraints, rules and/or expressions.

In step 520, a Smart may be selected from a collection of available Smarts based on user input. The Smart may be connected to one or more sources of data according to user input received at step 530. In steps 540 and 550, the Smart is executed for an output to be generated based on the applied analytic pattern(s). In some cases, a suitable representation may be displayed of the output on the user interface. Though results of execution of a Smart need not be directly displayed. Rather, the results may impact a data subset on which other analysis is based.

In step 560, after the output is produced, user input may be received through, for example, a user interface. This input may change any aspect of the data or parameters used by the analytic workbench to generate a result. The input, for example, may change a value of a parameter that is applied as input to a Smart. Alternatively or additionally, a user may execute another analysis tool that changes values of a data set to which a Smart has been connected.

In step 570, if the user input does not change the analytic pattern or data, then operation of the Smart can be finished, as step 580. However, if the user input modifies any data used by the Smart, then the Smart is run again, having considered the user input. The user input may be made, for example, via dynamic modification through a visual user interface. A feedback loop may be created as long as user input provided changes the data, and the Smart is re-run according to the updated information.

In a representative embodiment depicted in FIGS. 6-17, an information worker employs a user interface of an analytic workbench having a display region 1000 to analyze data for choosing a store site for opening up a business. The user interface provides visual representation(s) of appropriate data in a way that is intuitive for the user. A number of factors will come into consideration for the user in assessing where a suitable location for the business may be, such as for example, what the market potential is based on the location of a potential site of interest and customers located within a particular proximity of that site. One or more of these factors may be expressed as analytic patterns used in making a decision.

Figure 15:
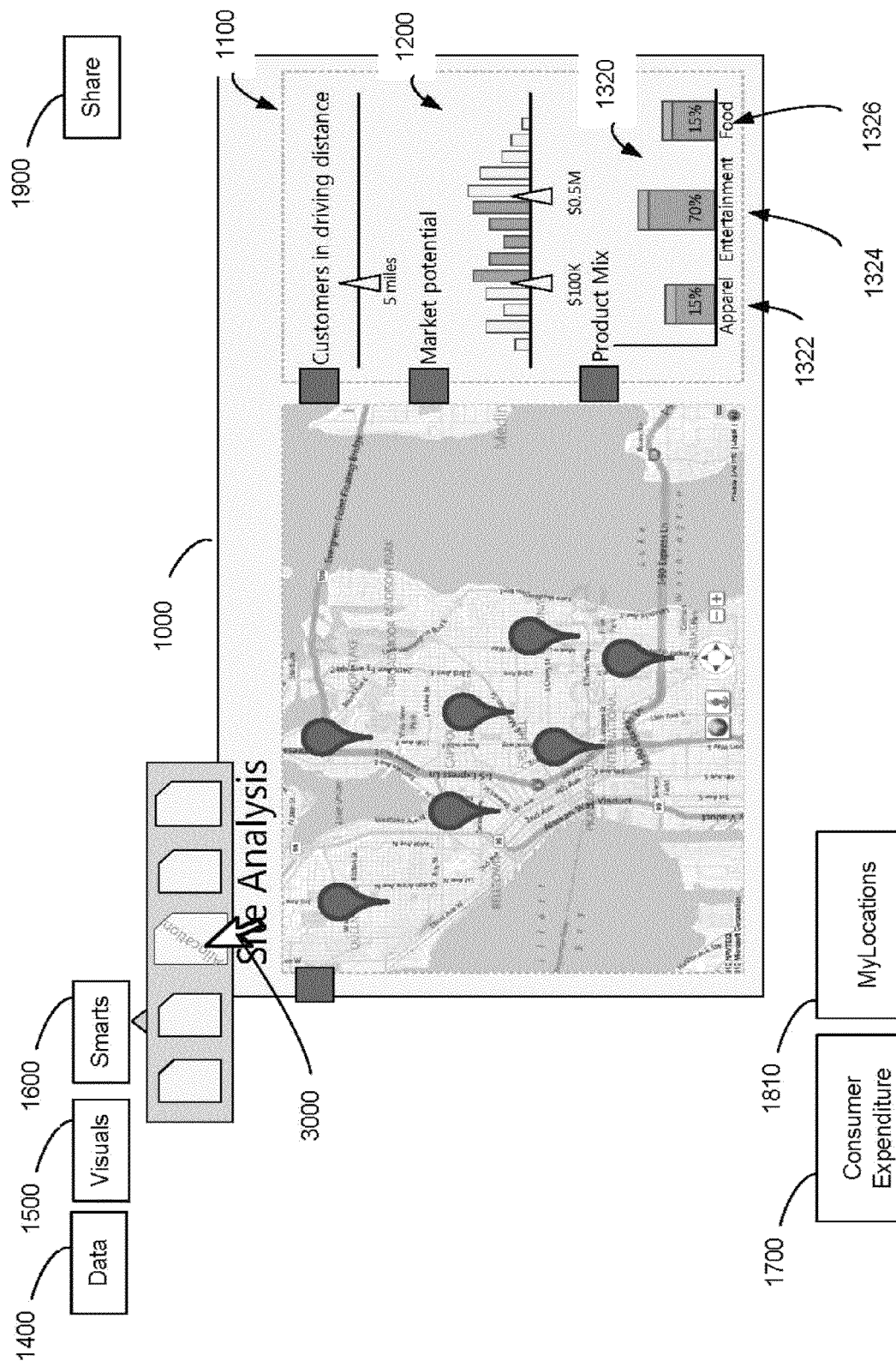
FIG. 15 is an illustration of the user interface of FIG. 14 in which the user selects a Smart to be applied on the user interface.
Figure 16:
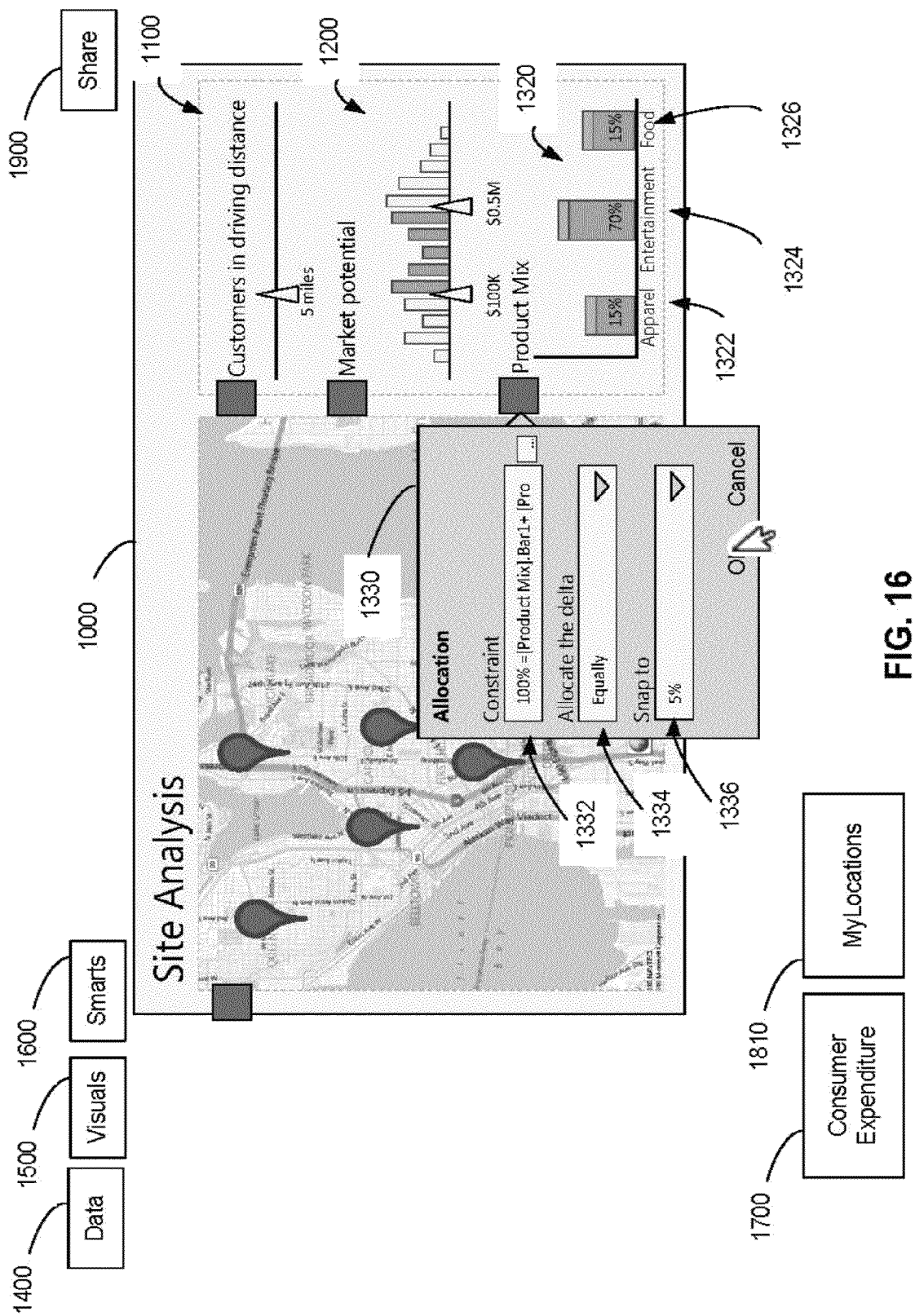
FIG. 16 is an illustration of the user interface of FIG. 15 where the user supplies input to be used in executing an analytic pattern in a selected Smart.
Figure 17:
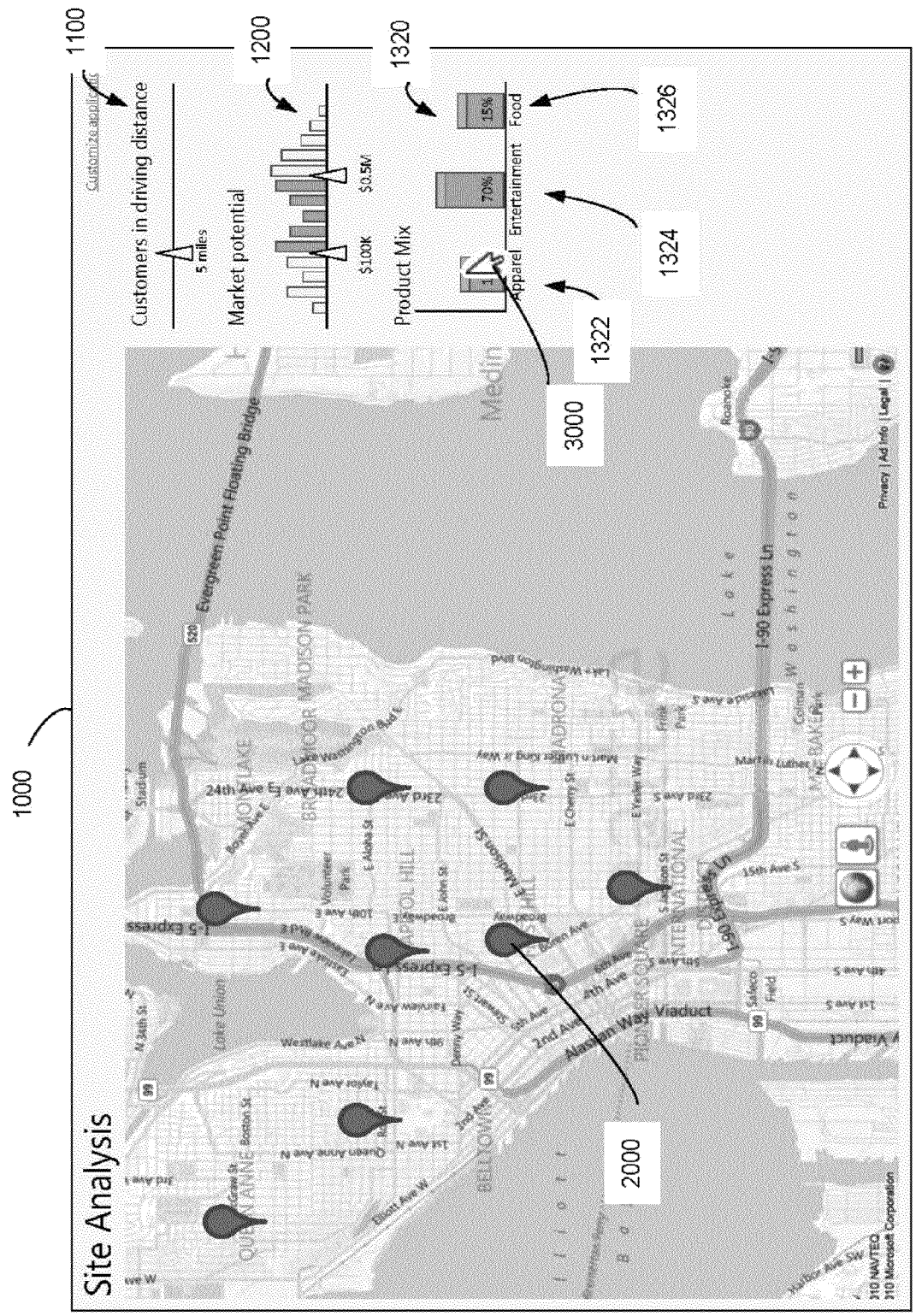
FIG. 17 is an illustration of a user interface that provides for a user experience based on application of the analytic pattern to the data.

FIGS. 7-10 provide screen snapshots of the user interface where data is imported into the system. FIGS. 11-14 depict manipulation of objects that may appear on the user interface and apply constraints on the data such that a subset of the data set selected is displayed on the user interface. Regardless of what data is selected for analysis, an analytic pattern may be applied to that data. For example, as the percentage of one business changes in a neighborhood, how the distribution changes of other businesses may affect a person's decision-making process in determining where to open a store. Accordingly, a Smart programmed with an analytic pattern that represents this relationship may be used. Such a Smart may be selected and used to process appropriate data according to an analytic pattern, in this example, for the user to be better informed of potential locations for the business. FIGS. 15-17 depict selection of such a Smart to determine the allocation of businesses in a particular region when the percentage of another type of business is altered.

Figure 6:
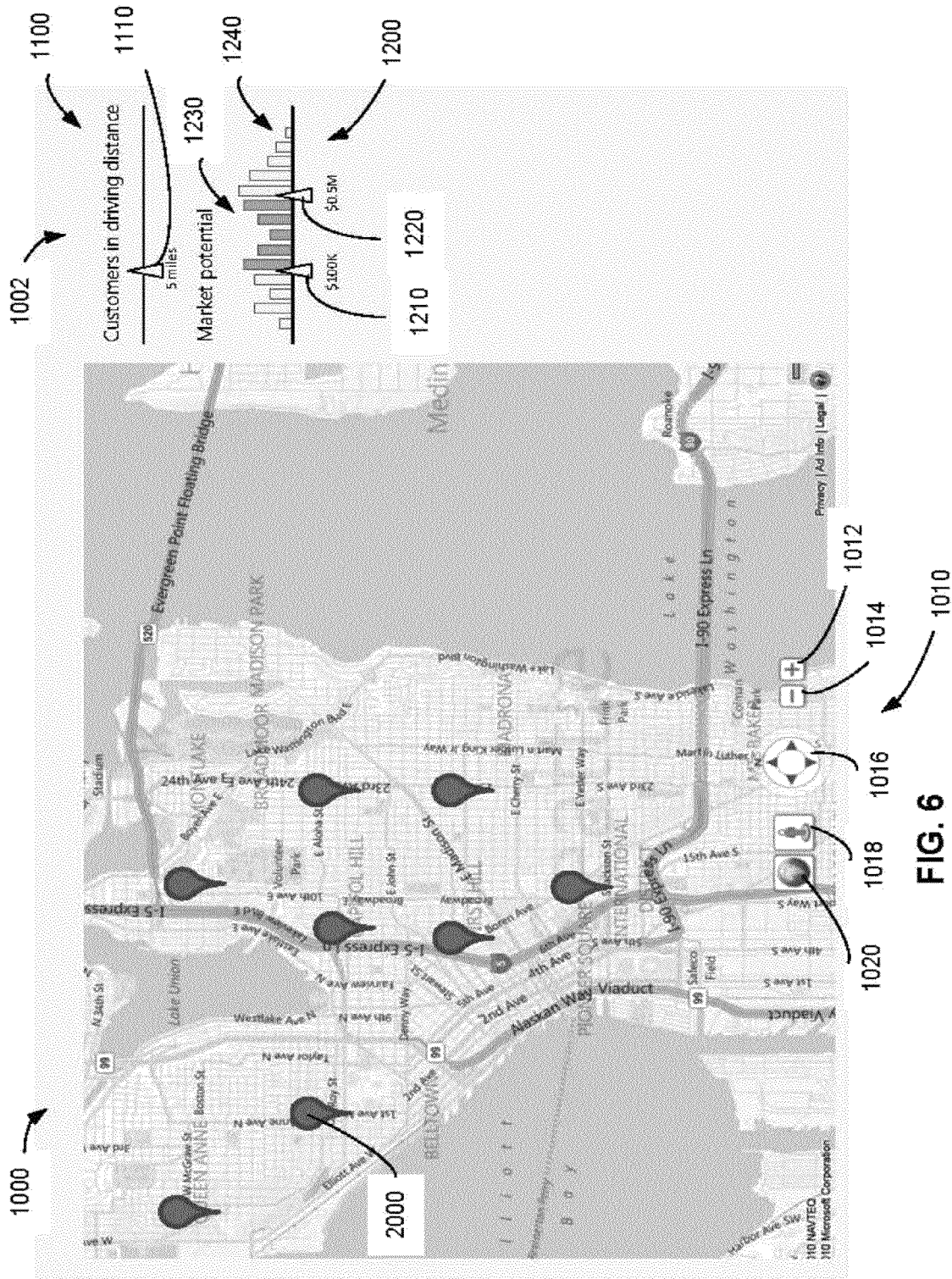
FIG. 6 is an illustrative example of a user interface through which a user is able to apply analytic patterns to a visually presented data set.

In this example, display region 1000 of a user interface, shown in FIG. 6, provides a map display for a user to visually assess where potential locations 2000 may be in a city or neighborhood for the user to start the business. In this respect, a processor of the computing device rendering the user interface display has access to a variety of information related to possible locations within the city that may be suitable for the business. Depending on how relevant the information is and what the user indicates his or her preference(s) may be regarding starting of the business, certain items of information may or may not be displayed on the user interface for visual interaction by the user. Indeed, not all of the data accessible to the processor of the computing device will be displayed since much of the information may be extraneous and cumbersome for the user to view. For example, while it may important for a user to be visually exposed to roads in a neighborhood that lead up to a potential site for the business or what other businesses surround the site, it might not be necessary for the user interface to also display superfluous information such as the current time of day on the display interface.

The user interface includes map adjustment controls 1010 so that the user may appropriately explore different sites of the map interactively. These controls may influence which portion of a subset of identified data points are displayed at any time. Control buttons 1012 and 1014 permit the user to select views that are closer in or further out at certain areas of the map that were previously shown. For example, actuation of control button 1012 will alter the displayed map to zoom into a particular region of the map for a closer view, and actuation of control button 1014 alters the displayed map to zoom out of a particular region of the map to view a broader perspective. Control arrows 1016 allow the user to view different regions of the map according to the particular direction actuated. The street view control button 1018, when dragged and placed on a certain region of the map, triggers photos to be presented of the actual location where the region on the map corresponds. The user may then manipulate views of the actual location to interactively explore, as desired, and as provided by the user interface. The earth view control button 1020 brings the map into a suitable perspective view setting.

A visually interactive region 1002 is available on the user interface for the user to input information regarding user preference(s) that filters the data presented on the display region 1000 according to one or more dimensions. In an embodiment, controls 1100, 1200 are provided in the visually interactive region 1002. Such controls may be implemented using graphical user interface programming techniques as are known in the art. These controls may be manipulated based on user input, which triggers execution of functional modules linked to the control. These functional modules may filter or otherwise constrain the data subset used to generate the display.

For example, as shown, a control 1100 is provided for a value of a parameter indicating a particular driving distance between a site under consideration and potential customers. The value of that parameter may be adjusted based on user input, such as may specify a position of slider 1110. Data on customers likely to shop at a store if located at a particular site may be filtered based on a constraint set by adjustment of slider 1110.

Another control 1200 may be provided for a different characteristic, market potential in this example, through which a user may further filter information presented on the display region 1000. In the example shown in FIG. 6, a lower bound 1210 and an upper bound 1220 may be set by the user to determine a range of interest 1230 of possible revenue (e.g., between $100,000 and $500,000 in monthly revenue). Here, heights of shaded bars shown within the range of interest 1230 indicate a number location in the data set with the degree of market potential at the particular values indicated. As such, the higher the bar is depicted, the more sites there are that could potentially generate the amount indicated in monthly revenue. Market potential is also shown for a region 1240 outside of the revenue range of interest, depicted as unshaded bars. Though, in this example, only data points corresponding to the shaded bars are selected for analysis.

Accordingly, in this specific example, proposed locations 2000 provided in the display of the user interface 1000 reflects locations of available store sites having a market potential within the range of $100,000 and $500,000 in monthly revenue based on customers within a 5 mile driving distance.

For data related to potential sites for starting a business, various dimensions of data may be correlated in ways that are not readily apparent to a user. Lease price, driving distance and market potential may be correlated such that, as the user changes values of filter criteria in each of these dimensions, the number of potential sites meeting the criteria may vary in a way that is not immediately appreciated by a user. For example, a user may initially consider a neighborhood of 100 locations with efforts in mind to meet the user's criteria where the user specifies filter criteria that limits results to locations in the particular neighborhood having a market potential with a monthly revenue over $1,000,000 for customers that are within 2 miles driving distance. In some cases, such criteria may be overly restrictive and return no locations in the neighborhood with a market potential having a monthly revenue over $1,000,000 for customers that are within 2 miles driving distance. In response, the user may relax the filter criteria to include locations having a market potential with a monthly revenue between $100,000 and $500,000 for customers that are within 5 miles driving distance matching the criteria, returning substantially more potential locations to start the business. For example, potential locations 2000 as indicated in FIG. 6 may appear based on the relaxed filter criteria. Further, upon relaxation of the filter criteria even more, additional potential locations may appear as highlighted on the display region 1000. Or, filter criteria may be adjusted such that a different set of potential locations are featured by the display region 1000.

The proposed locations 2000 depicted may be automatically adjusted dynamically on the interactive display region 1000 as a user provides input(s) relating to the adjustment regions 1100 and/or 1200. A user can repeatedly adjust parameters of either dimension as many times as desired and view changes in how the items that fall within the adjusted range(s) are distributed. Such a display region 1000 and visually interactive region 1002 may help a user visualize ranges of values of each of the dimensions that may serve as filter criteria to generate a filtered set of items of data of a desired size and focus.

A system may provide a user interface to support exploration of filter criteria in any suitable fashion. In some cases, dynamic exploration of filter criteria can be performed by a user through the use of interactive sliders and bar graphs. The user can, using conventional techniques for graphical user interfaces, provide input that adjusts the range of a slider, corresponding to a dimension, on an interactive display. The system may dynamically compute and then display the distributions of items along one or more dimensions based on the user input. Likewise, conventional interface techniques may be used to specify a value for a bar in a bar graph and display computed results based on that input. Though, it should be appreciated that any suitable interface techniques may be used to receive user input and present to the user results of applying that input.

Figure 7:
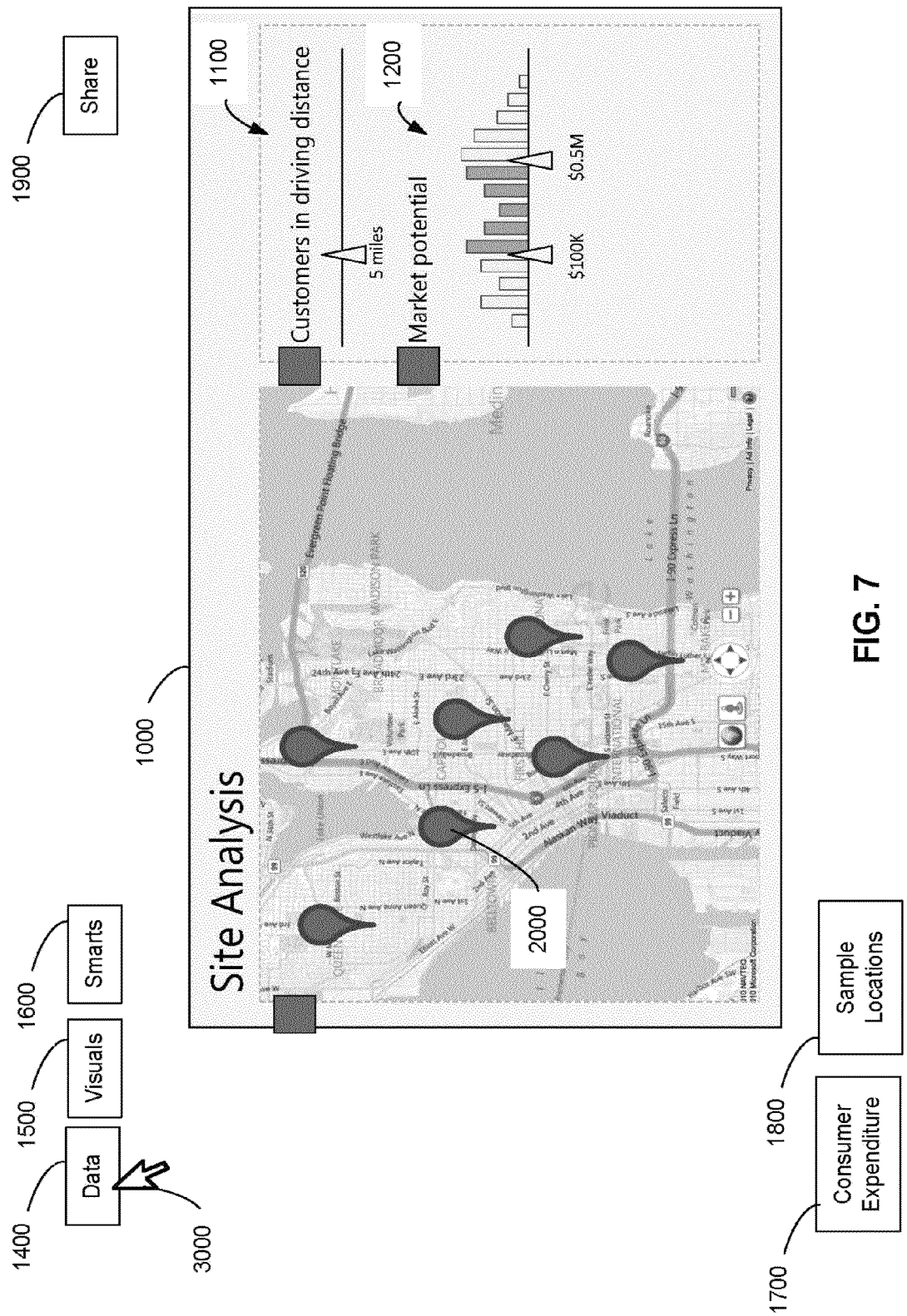
FIG. 7 is an illustration of the user interface of FIG. 6 in an operating state in which a user activates a control to select data for analysis.

FIG. 7 illustrates a user interface that includes display region 1000 having controls 1100, 1200 for different dimensions and proposed locations 2000 within the displayed map based on adjustment of the respective controls. In addition, other interactive features may be provided in the user interface and may be manipulated through any suitable input method, such as for example, with a pointer 3000 positioned by user operation of a mouse. For example, aspects of the user interface may enable a user to determine what data is made available and presentable through the user interface as well as how the data is visualized. Also, the user may select one or more suitable analytic patterns, captured as Smarts, for manipulating data by an operation performed according to the analytic pattern. As will be discussed further below, for the example provided, an analytic pattern may provide an allocation of how certain types of businesses will be distributed as one of them changes in a certain region. Though it should be appreciated that a Smart may be provided for any suitable analytic pattern. An analytic pattern, for example, may rank potential locations that fit within filtered user criteria and present the locations to the user in a visually interactive manner.

Figure 8:
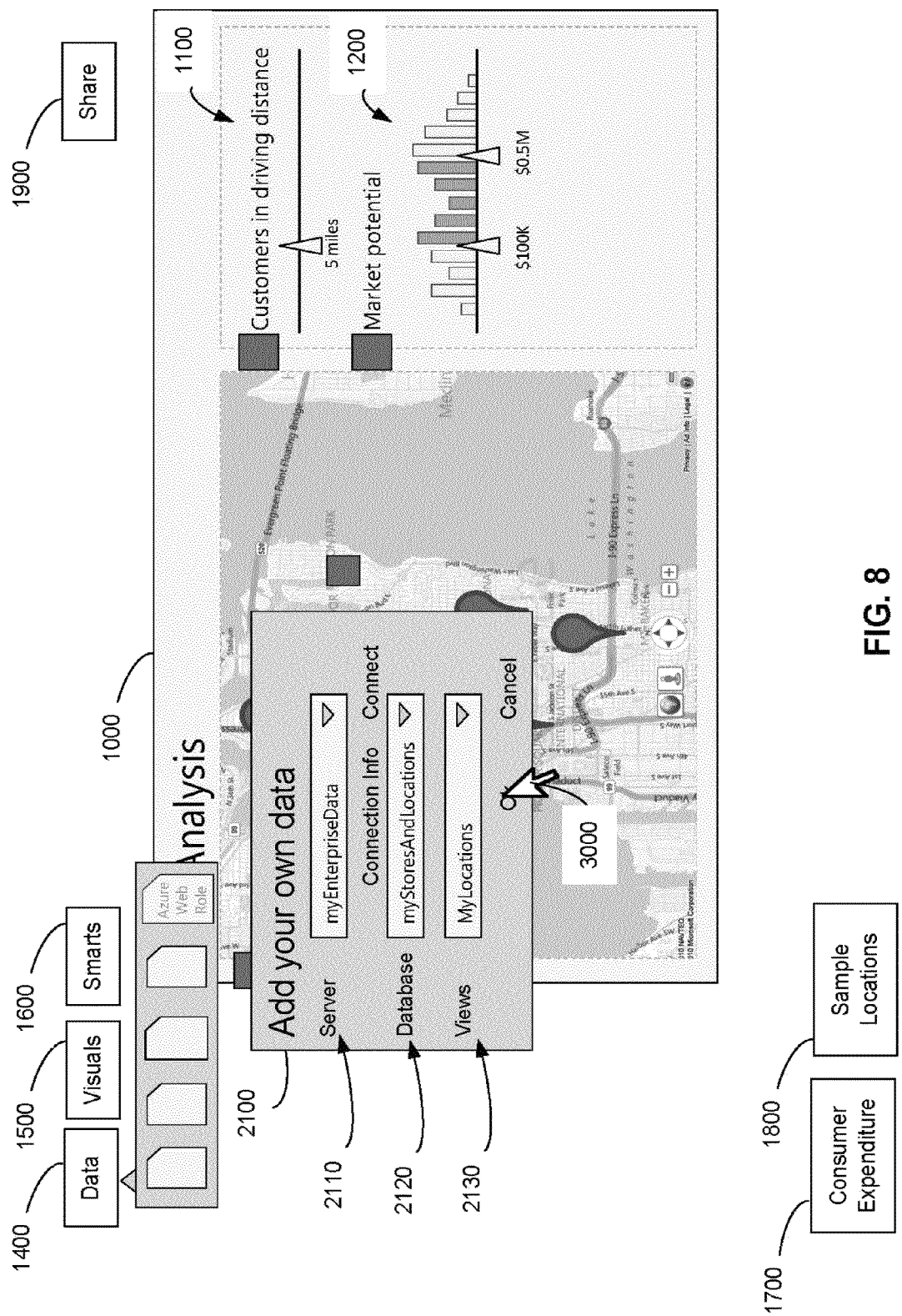
FIG. 8 is an illustration of the user interface of FIG. 7 in a state in which a user views a subset of items of data that have been selected through interaction with the user interface.

Data may be presented as input to the analytic workbench executing on the computing device, in any suitable way, such as is shown in FIGS. 7-10, for subsequent analysis. In an embodiment, the user interface may enter into a data input mode through user selection of "Data" box 1400, as depicted in FIG. 7. When the user chooses an option for inputting data into the computing device, as shown in FIG. 8, Data Input box 2100 is then displayed on the user interface for particular items of data to be selected for analysis. Access to the new items of data is provided through Data Input box 2100, displaying a pathway for the user to find the additional data to be considered and for the computing device to access the data. The "Server" drop down box 2110 permits the user to choose a server computer (e.g., "myEnterpriseData") from which the additional data are stored and accessed. The "Database" drop down box 2120 allows the user to choose the database (e.g., "myStoresAndLocations") stored on the server computer where the additional data are located. The "Views" drop down box 2130 enables the user to choose specific items of data (e.g., "MyLocations") to be input for consideration in the analysis. As such, once the appropriate items of data are loaded into the analytic workbench, the data may be filtered, as described above and/or one or more analytic patterns may be applied to the data, as described below.

Figure 9:
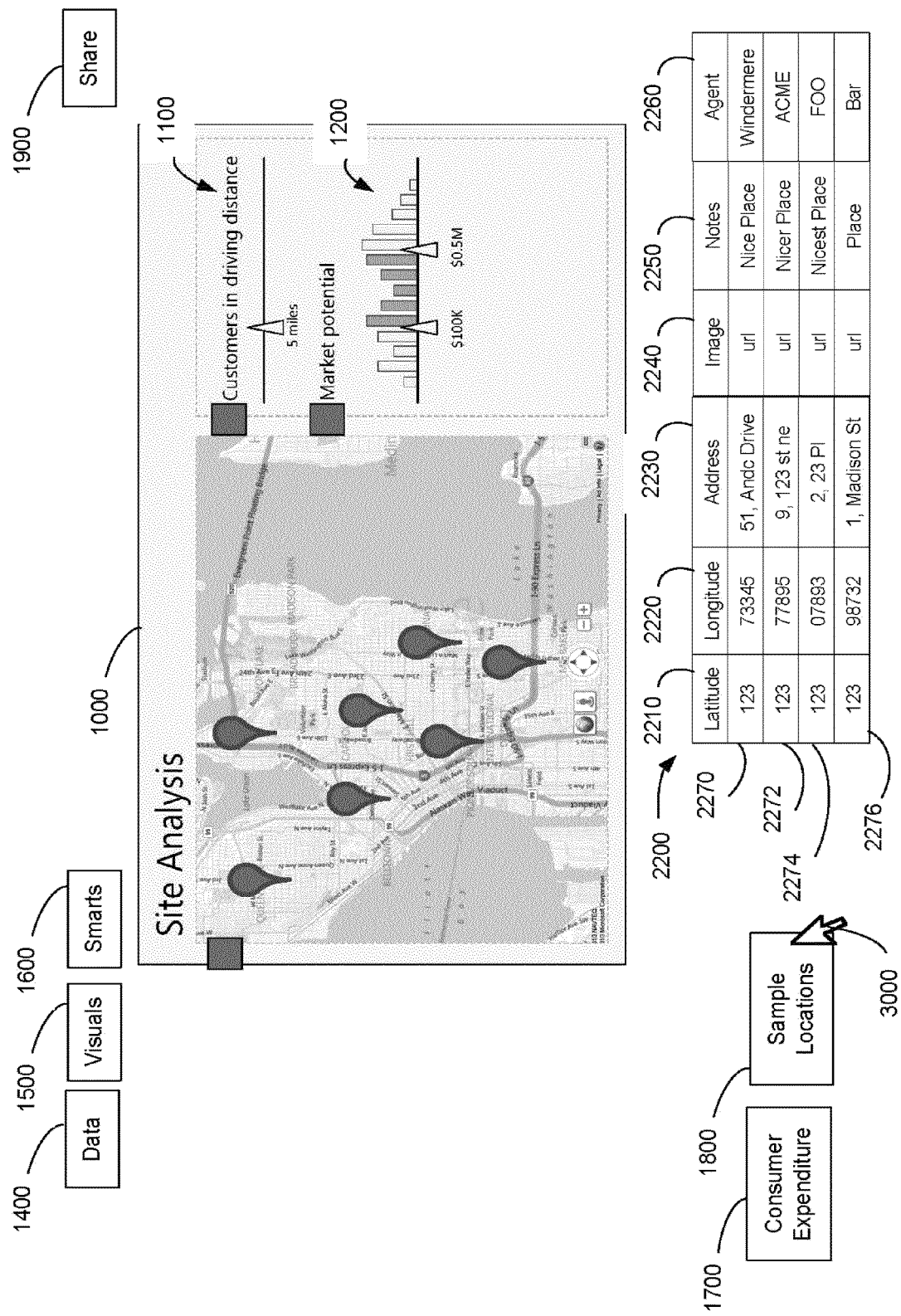
FIG. 9 is an illustration of the user interface of FIG. 8 in which the user chooses items of data to be analyzed through the user interface.

Once the desired data set (e.g., "MyLocations") is selected and loaded into the computing device, items of the data set may be viewed in any suitable format, such as that shown in table 2200 of FIG. 9. As an example, table 2200 includes a number of locations 2270, 2272, 2274, 2276 having supplemental information also provided about each location. Such supplemental information for each location may or may not contribute to factors that would determine whether a user would start the business at that location. However, such supplemental information may still be provided, as appropriate. As shown in table 2200, for each location, a number of parameters are provided, such as, and without limitation, the latitude 2210 and longitude 2220, the address 2230, an image 2240, notes 2250 regarding the location and the agent 2260 representing the location. The latitude and longitude of the location will affect, for example, the distance that consumers will need to drive so as to reach the location. Or, notes regarding the location may be helpful for the user to determine whether the site will require more or less work to be done to make the location more friendly to potential customers. As such, a "nicer place" or the "nicest place" may be more appealing for a potential business owner, in being more likely to attract consumers. In the overall analysis of presenting to the user proposals for where to start the business, added data sets of locations (e.g., from table 2200) provided to the computing device may be considered in conjunction with other items of data that may have also been loaded into the device at different times. Analysis may consider any of these data sets or any combination of the data sets.

Figure 10:
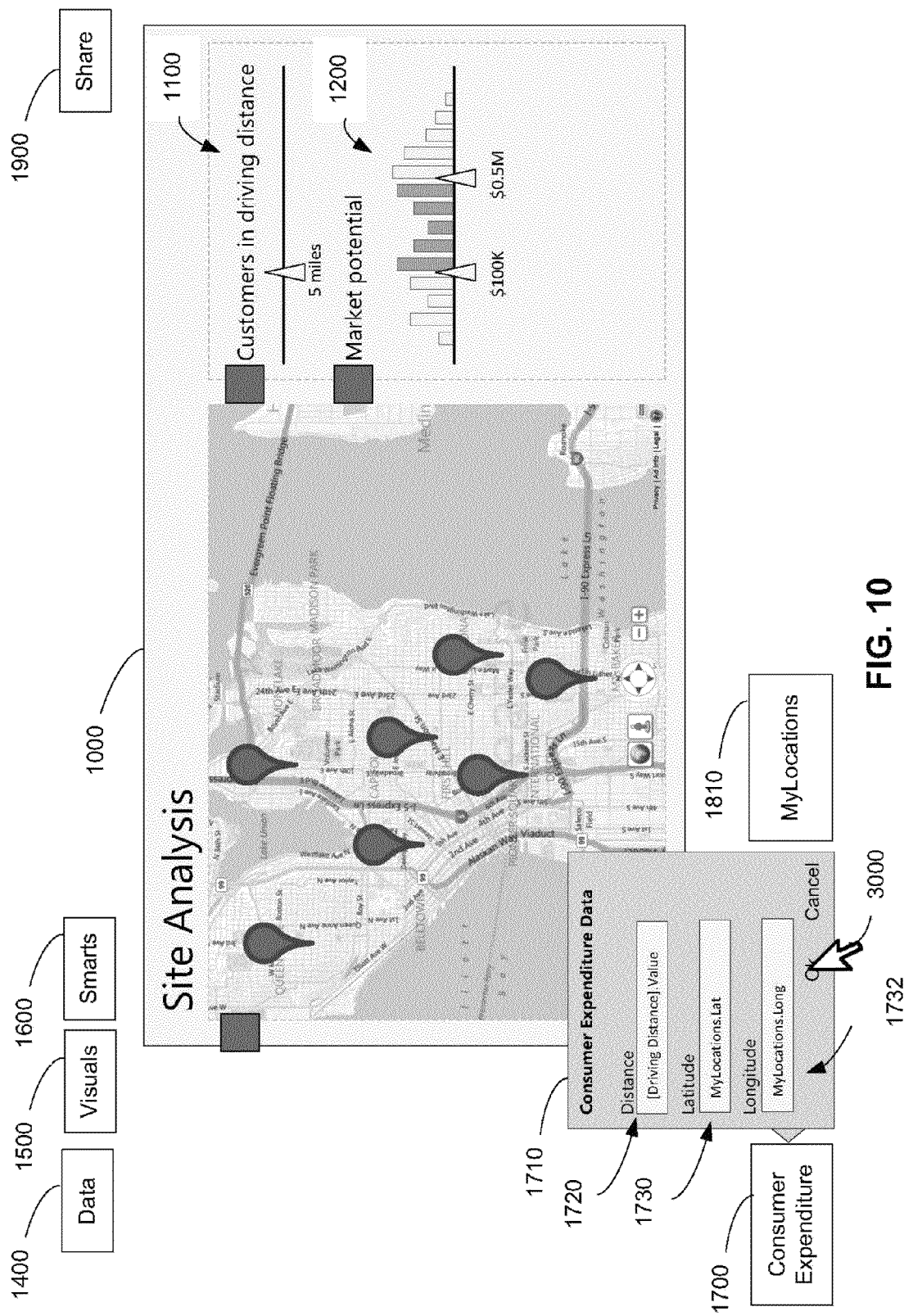
FIG. 10 is an illustration of the user interface of FIG. 9 where the user indicates more items of data to be analyzed through the user interface.

Data sets loaded into the analytic workbench may be accessed by user action. As shown in FIG. 10, "Consumer Expenditure" box 1700 is selected to trigger a visual of "Consumer Expenditure" input box 1710, enabling a user to view or input particular parameters of the additional data into the computing device. In the example, the "Distance" region 1720 permits the user to input a driving distance value from the additional data set (e.g., "MyLocations") into the computing device or to link that data set to a value existing in the display subset 252 (FIG. 2) of the workbench. For example, the consumer expenditure data set may be linked to control 1100 such that a value entered into the control influences the items in the selected consumer expenditures data set. "Latitude" region 1730 and "Longitude" region 1732 provide the user with the ability to input a specific global location of a site from the additional data set into the computing device.

Figure 11:
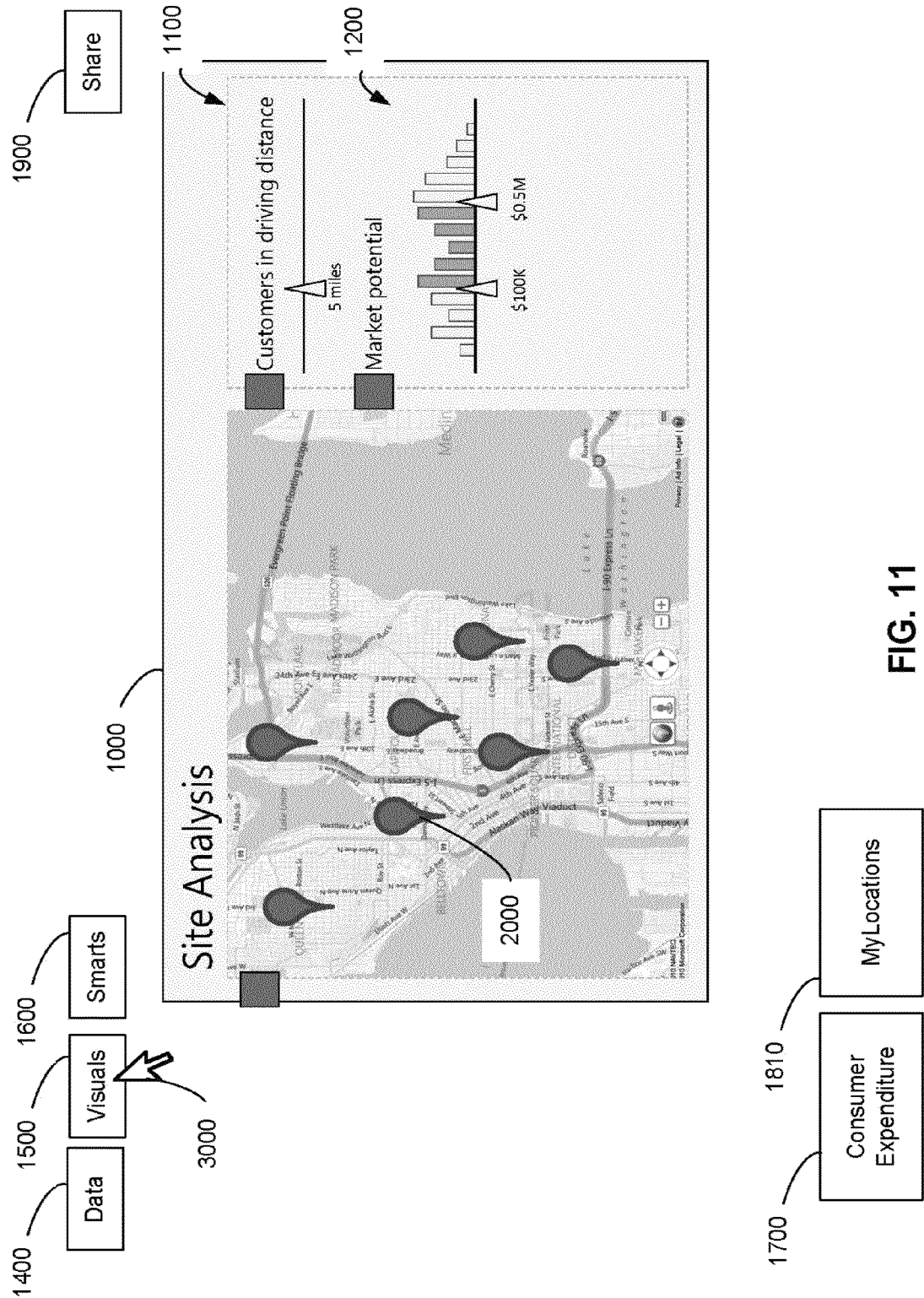
FIG. 11 is an illustration of the user interface of FIG. 10 in which the user provides input requesting a menu of visual objects that can be added to the user interface.
Figure 12:
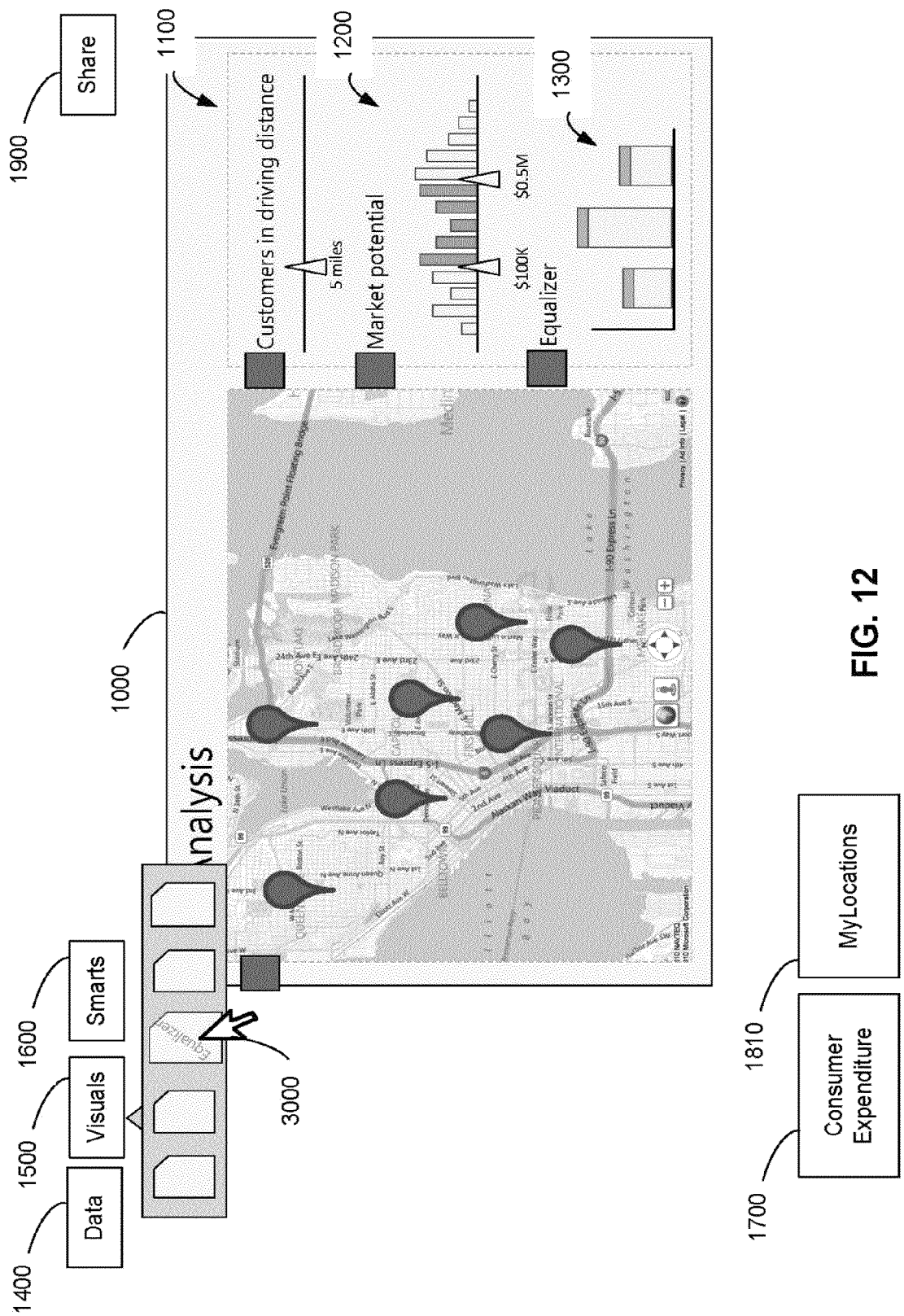
FIG. 12 is an illustration of the user interface of FIG. 11 where the user selects how an object is to be added to the user interface.

When the data has been input into the computing device, the user may appropriately determine how information presented by the data may be visualized. As shown in FIG. 11, the user interface enters into a visual input mode via user selection of "Visuals" box 1500. Selection of box 1500 may allow a user to select controls, such as controls 1100 and 1200, from a menu. For example, shown in FIG. 12, pointer 3000 chooses a preference for visualizing data by selecting an "Equalizer" control. Accordingly, an additional control 1300 is provided in the visually interactive region 1002 of the user interface so that the user may view a general distribution of a certain type of information. Once selected, this control may be customized based on the data in the analytic workbench.

Figure 13:
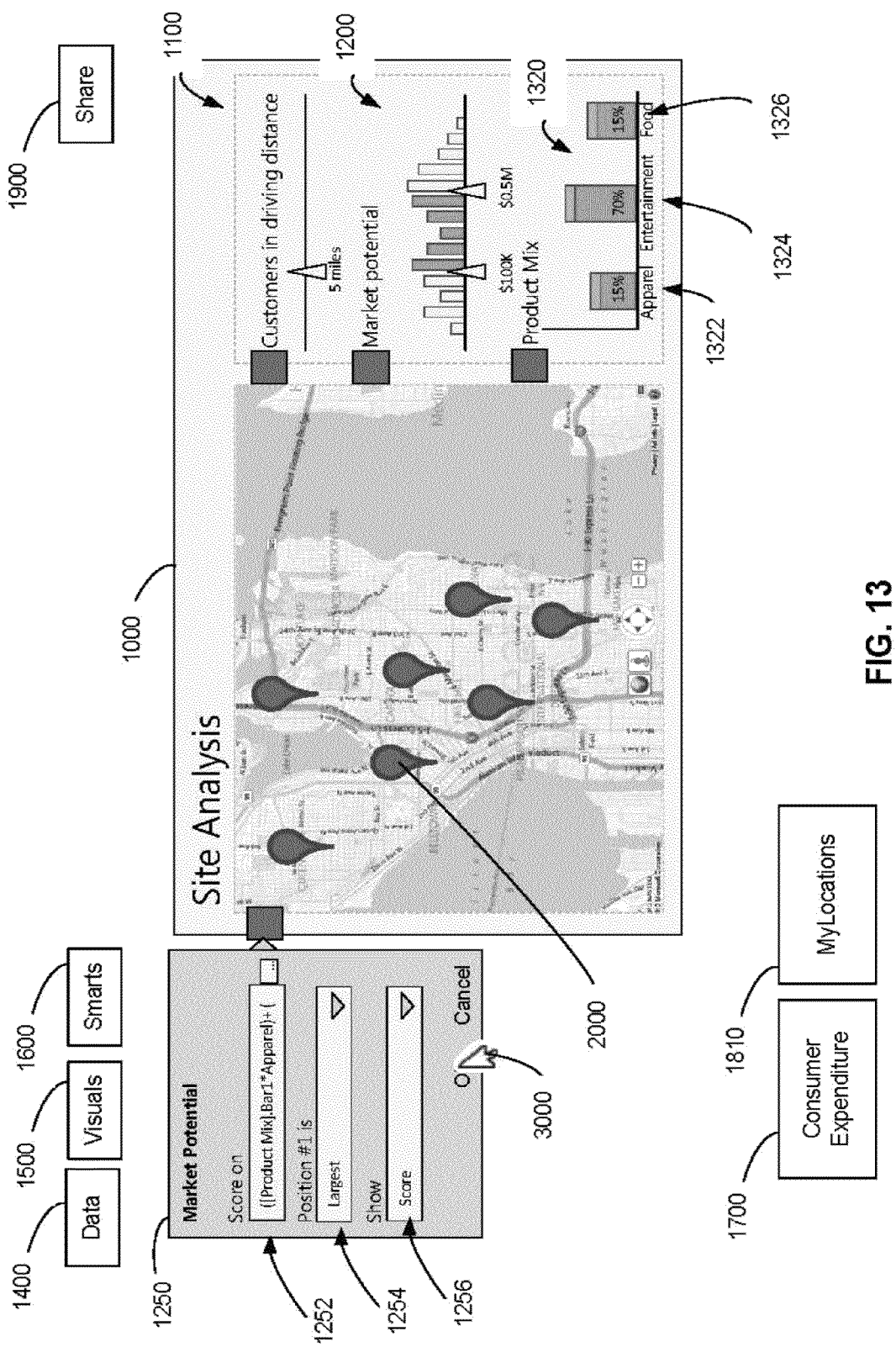
FIG. 13 is an illustration of the user interface of FIG. 12 where the user provides input configuring a selected object added to the user interface.

As shown in FIG. 13, "Market Potential" box 1250 provides a non-limiting embodiment for how control 1200 may be customized based on control 1320. "Market Potential" box 1250 includes a "Score" region 1252 which provides the user with the ability to input into the computing device how to assign scores to each of the potential locations 2000. In this example, the score may be computed based on user inputs received through control 1320 and other factors. "Market Potential" box 1250 also includes a "Position" region 1254 where a user may determine, for example, that potential locations associated with higher scores be depicted on the display map to be larger than potential locations having lower scores. The "Show" region 1256 allows the user to determine that each potential location displayed on the user interface indicate the market potential score assigned to that location.

Based on the input provided in the "Market Potential" box 1250, the user may readily view what the score is for each ranked location, and can make a determination as to what general regions displayed on a map may be more suitable for starting the business. For example, if the user seeks to open up a clothing store, potential locations near other apparel stores may be readily displayed on the user interface to have, on average, higher scores than other potential locations considered.

Figure 14:
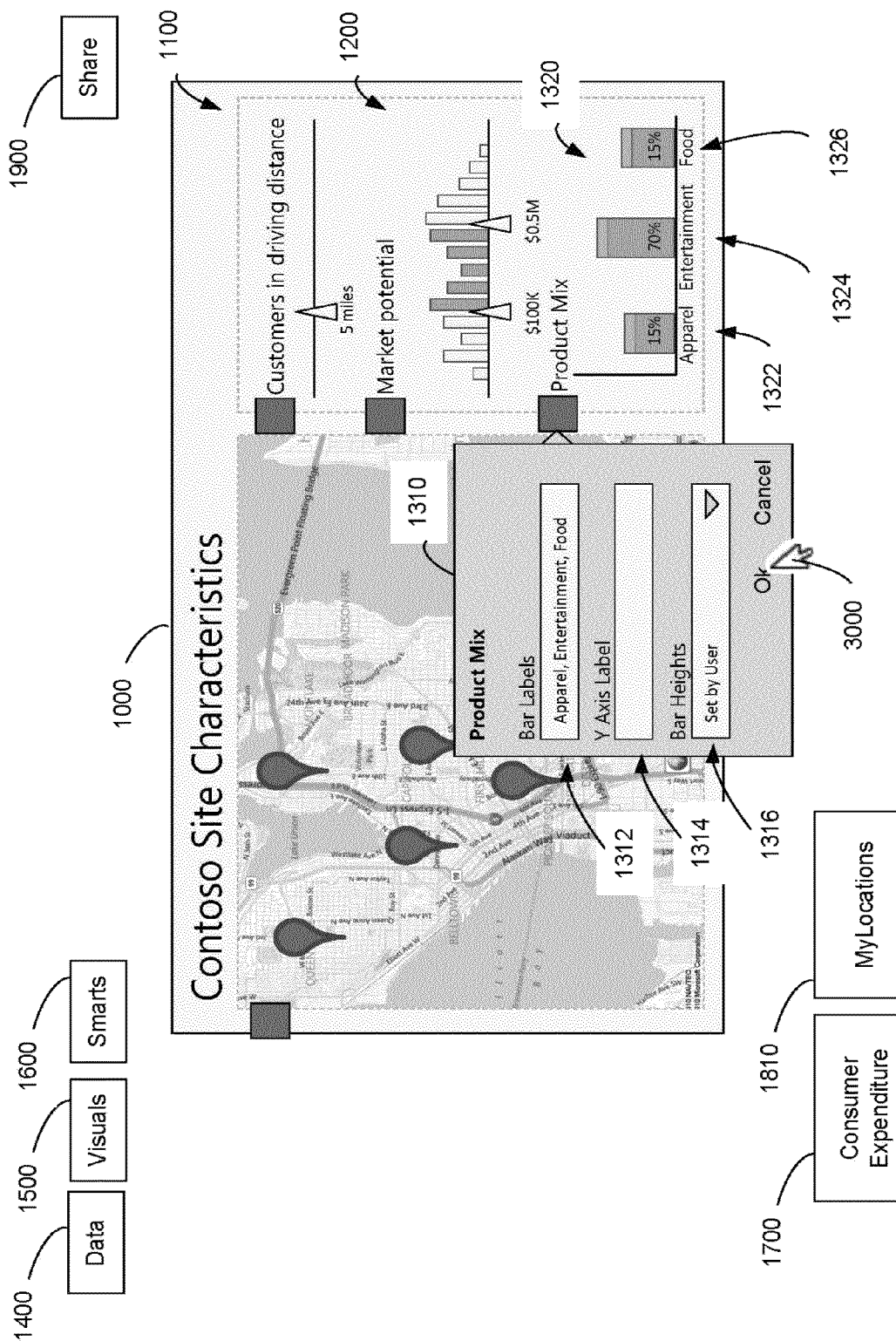
FIG. 14 is an illustration of the user interface of FIG. 13 in which the user provides further input configuring a selected object added to the user interface.

FIG. 14 shows a similar customization of control 1320. In this example, the user determines how data should be presented in control 1320. Accordingly, the user manipulates features of "Product Mix" box 1310 to create a "Product Mix" control 1320 that presents information in the form of a bar graph that represents the distribution of product types that are sold within a particular locale. "Product Mix" box 1310 provides a number of features that allow the user to adjust how parameters in the "Product Mix" control 1320 are presented. For example, "Product Mix" box 1310 includes a "Bar Labels" region 1312 for the user to label bar graphs as "Apparel", "Entertainment" and "Food." The "Y Axis Label" region 1314 permits the user to label the Y axis of the bar graph, however, for the example provided, the "Y Axis Label" region 1314 is left blank. In the example, the "Bar Heights" region 1316 is determined to be set by the user, such as by input indicating a bar height. Accordingly, the "Product Mix" region 1320 illustrates a distribution of various types of products that may be sold in the store for which a site is being sought.

As shown in FIG. 14, "Product Mix" control 1320 includes a bar 1322 representing the percentage within the geographical region of interest that sells apparel to be 15%; bar 1324 that illustrates the percentage within the geographical region of interest that is focused on entertainment to be 70%; and the bar representing the percentage within the geographical region of interest that sells food is 15%.

The computing device may further apply analytic patterns, captured as Smarts, to data providing for a higher, more abstract level of data processing and possibly interaction with the user. As illustrated in FIG. 15, the user interface enters into a smarts input mode through user selection of "Smarts" box 1600, upon which a menu of Smart components are available in a library are made available for selection. The pointer 3000 chooses a Smart having an analytic pattern that provides an allocation to be applied to the data. In this example, the analytic pattern defines when user input changes one portion of the allocation, how other portions of the allocation make a corresponding change. Though it should be appreciated that this is just one example of a Smart that may be selected.

As shown in FIG. 16, upon selection of the Smart component, "Allocation" box 1330 appears, where the user can define aspects of the analytic pattern. In an example, the user has specified, based on input in the "Constraint" region 1332, that the allocation should add up to 100%. When this Smart is executed, conditional actions may be taken if the constraint is not met. For example, the expression indicated in the "Allocate the Delta" region 1334 may be executed to change the allocation. Here, the "Allocate the Delta" region 1334 has been set by the user to indicate that the difference between the sum of the allocations and 100% should be divided equally over all allocations. The "Snap to" region 1336 defines another equation that can be executed when the Smart is executed. Here, that equation provides a computation by which each allocation should be rounded to 5% of the actual percentage.

As a result of the selected Smart, the associated analytic pattern initiates an interactive experience to be dynamically visualized through the user interface, incorporating the data and controls previously selected. Upon initiation of the user experience, FIG. 17 shows a user interface display 1000 where the user is readily able to view potential locations 2000 that fit within criteria for where the user could start a business. Accordingly, through application of the analytic pattern(s) of the selected "Smart," the interface allows the user to dynamically manipulate one of the bars 1322, 1324, 1326 of "Product Mix" box 1320. When one of the bars 1322, 1324, 1326 is raised or lowered, based on the constraint(s) set by the "Allocation" analytic pattern, the other two bars will dynamically change. For example, if pointer 3000 raises the apparel bar 1322 to 35%, because the "Allocate the Delta" region 1334 was set to equal, the entertainment bar 1324 and food bar 1326 will be lowered equally, by 10% each. Further, because the "Snap to" region 1336 was set to 5%, the apparel bar 1322 is raised to a value that is a multiple of 5%, hence 35%, rather than, for example, 33%.

As one of the bars 1322, 1324, 1326 is raised or lowered, the display of potential locations 2000 on the displayed map may also change accordingly. For example, if the percentage of apparel in a neighborhood is raised from 15% to 35%, the likelihood that a clothing store will be successful in the neighborhood will increase. Accordingly, more potential locations 2000 will dynamically appear on the displayed map by virtue of the apparel bar 1322 being raised through the user interface. Conversely, if the apparel bar 1322 is lowered, then it is likely that the number of potential locations 2000 displayed on the map will decrease.

In this example, the Smart may be preconfigured to present an analytic pattern associated with using a bar graph style control, such as control 1320. The Smart may be customized by user input selecting or inputting expressions that define the analytic pattern. The Smart can also be customized by connecting it to data sources. In this example, data such as the value of each allocation is connected to the Smart. It should be appreciated that for other Smarts, other types and sources of data may be connected.

An example of another type of Smart, not expressly depicted, is one that proposes to the user a number of potential locations to the user in accordance with a ranked listing of sites determined by the analytic pattern(s). Accordingly, the user interface may step through the ranked listing for the user to view each of the proposed locations in successive order.

Moreover, Smarts may be used together to achieve even more complex functions. The Smarts may be applied in a feedback loop as shown in FIG. 5. If a Smart changes data that impacts results of application of another Smart, the impacted Smart may be re-executed. For example, the "Allocation" analytic pattern may be used in combination with another analytic pattern. For example, by manipulating the overall distribution of products sold in a particular location using the "Allocation" analytic pattern, a different analytic pattern that prioritizes potential locations may dynamically modify the rankings of potential locations such that the display of potential locations 2000 varies. For example, if the percentage of apparel stores increases in a region, the ranking potential for a location to be a clothing store in that particular region also increases.

Figure 18:
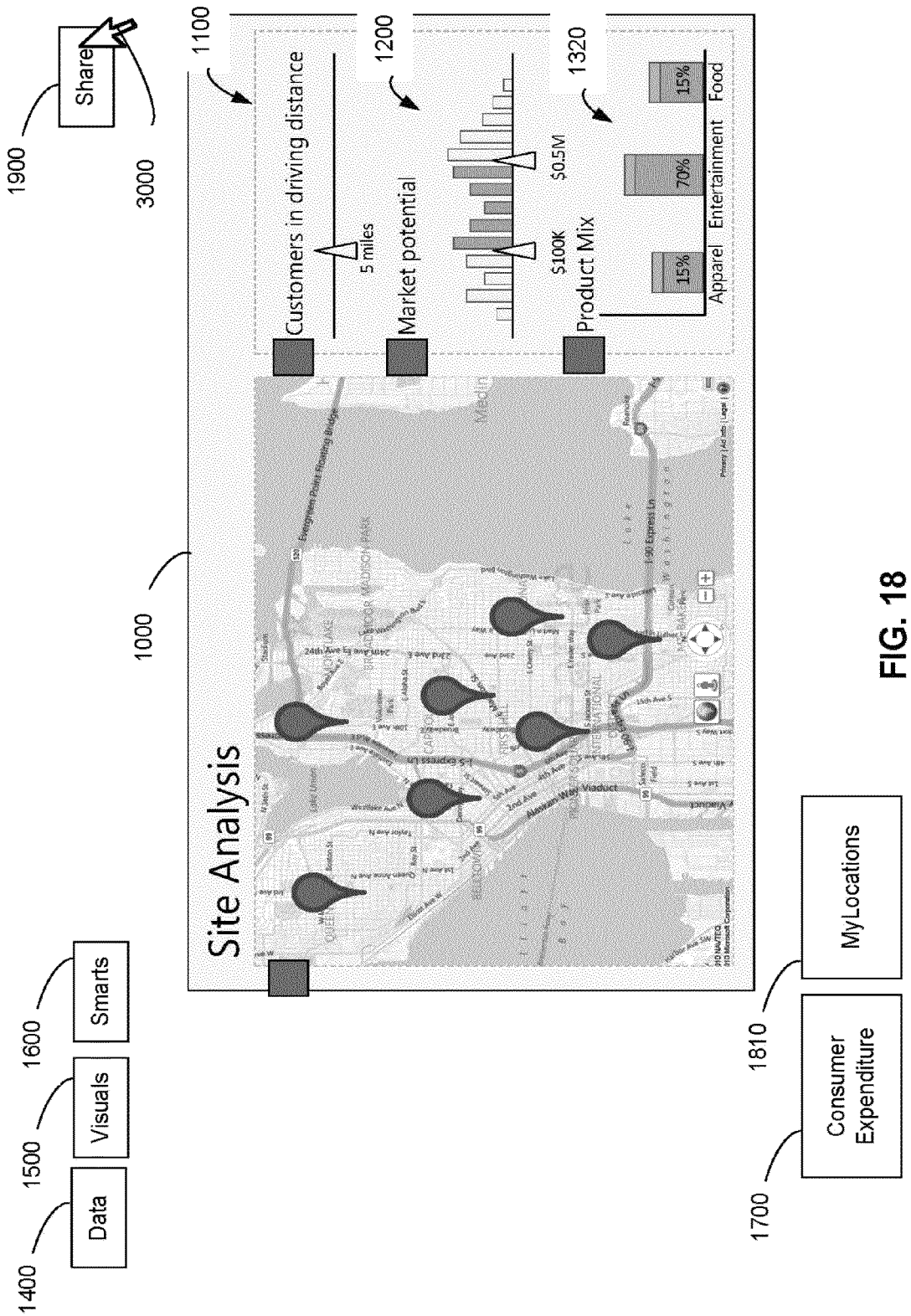
FIG. 18 is an illustration of a user interface where the user indicates that a visual interaction be shared in other interfaces.
Figure 19:
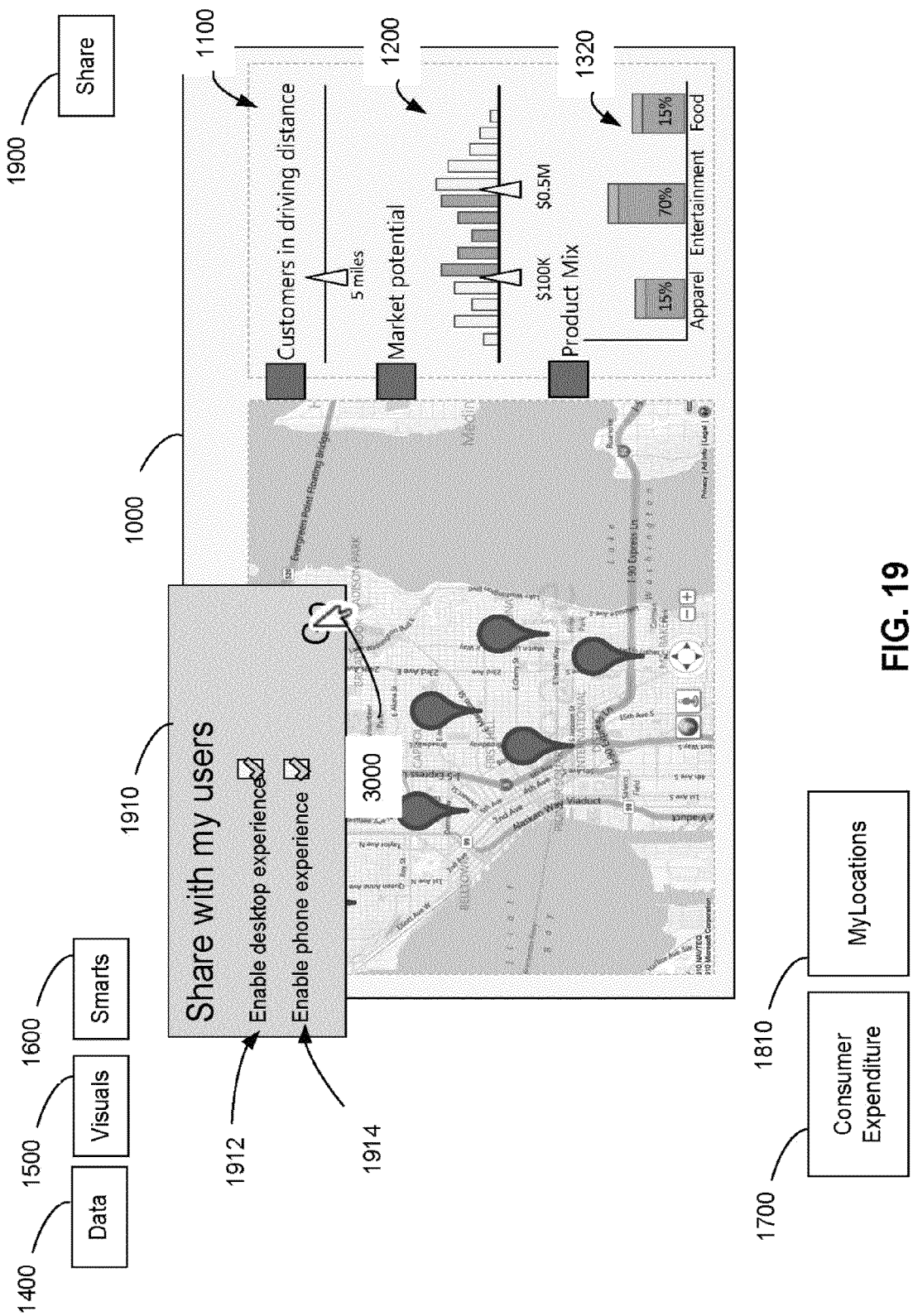
FIG. 19 is an illustration of the user interface of FIG. 19 in which the user indicates which other interfaces a visual experience will be shared.

As the analytic pattern has processed the data and provided a user experience, as shown in FIGS. 18 and 19, the user may further select "Share" box 1900 to include other computing devices and/or other users in the experience. In the example, selection of "Share" box 1900 may allow the user to input what computing device(s) for the user experience to be incorporated within. Accordingly, as depicted in FIG. 19, the user determines through "Share Input" box 1910 that a desktop and mobile phone experience be enabled through respective checkboxes 1912 and 1914. Though, it should be appreciated that the user experience may be shared in other ways. For example, a Smart either defined or customized, by a user, may be shared with another user.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rackmounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, digitizing tablets, and touch-responsive display screen, such as direct-interaction displays, multi-touch displays that respond to two or more fingers on the screen at the same time. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer-readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A method comprising:
with at least one processor:
providing a library comprising a plurality of reusable components encoding corresponding analytic patterns;
providing a menu listing the plurality of reusable components of the library;
receiving a first user input identifying a selected reusable component from the menu, wherein the selected reusable component encodes a selected analytic pattern corresponding to the selected reusable component;
receiving a second user input specifying a data source of at least one data connector of the selected reusable component;
receiving a third user input specifying filter criteria to be applied to data from the specified data source to obtain filtered data; and
executing the selected reusable component on the filtered data to produce at least one result by evaluating at least one of an equation, rule, constraint or expression representing the selected analytic pattern and the filtered data obtained from the specified data source, wherein the selected reusable component includes metadata configured to generate a visual object displaying operation of the selected analytic pattern.

2. The method of claim 1, wherein executing the selected reusable component to produce at least one result comprises at least one of:
selecting an ensemble of first items according to the selected analytic pattern from the filtered data obtained from the specified data source;
minimizing a distance between second items represented by the filtered data according to the selected analytic pattern;
generating a proposed map indicating a plurality of locations;
generating a plan for third items to occur according to the selected analytic pattern and the filtered data obtained from the specified data source;
generating a schedule for fourth items to occur, the schedule being generated according to the selected analytic pattern and the filtered data obtained from the specified data source;
maximizing merit for fifth items according to the selected analytic pattern and the filtered data obtained from the specified data source; or
generating a prioritized list of sixth items according to the selected analytic pattern and the filtered data obtained from the specified data source.

3. The method of claim 2, wherein:
executing the selected reusable component comprises generating the plan, and
generating the plan comprises generating a list of action items.

4. The method of claim 2, wherein:
executing the selected reusable component comprises generating the schedule, and
generating the schedule comprises generating a list of events to occur at specified times.

5. The method of claim 1, wherein executing the selected reusable component comprises generating an interactive representation according to the selected analytic pattern and the filtered data obtained from the specified data source.

6. The method of claim 1, further comprising updating an output based on the at least one result.

7. The method of claim 1, wherein executing the selected reusable component includes performing the visual object displaying operation and thereby displaying the at least one result.

8. The method of claim 1, wherein the visual object displaying operation of the selected analytic pattern includes displaying an input of at least a portion of the specified data source to the at least one data connector.

9. The method of claim 1, wherein the visual object displaying operation of the selected analytic pattern includes displaying the at least one result of evaluating the at least one of the equation, the rule, the constraint or the expression representing the selected analytic pattern and the filtered data.

10. The method of claim 1, wherein executing the selected reusable component includes displaying intermediate process steps of the executing according to the visual object displaying operation.

11. At least one computer-readable storage device comprising computer-executable instructions that, when executed by at least one processor, perform a method comprising:
receiving a first user input selecting a component encoding an analytic pattern;
receiving a second user input entering one or more declarative statements and modifying the analytic pattern to reflect the one or more declarative statements;
specifying a data source for at least one data connector of the selected component;
receiving a third user input specifying filter criteria to be applied to data from the specified data source to obtain filtered data;
executing the selected component on the filtered data to produce an interactive visualization of at least one result by evaluating the filtered data and the analytic pattern, the executing including evaluating the filtered data according to the one or more declarative statements entered by the second user input;
receiving a fourth user input specifying further filter criteria to be applied to the data from the specified data source to obtain further filtered data; and
responsive to receiving the fourth user input, automatically re-executing the selected component on the further filtered data with the one or more declarative statements entered by the second user input.

12. The at least one computer-readable storage device of claim 11, the method further comprising:
providing a display interface comprising a control, wherein the third user input manipulates the control to specify the filter criteria and the fourth user input manipulates the control to specify the further filter criteria.

13. The at least one computer-readable storage device of claim 12, wherein the control comprises an adjustable slider that is moved by the third user input to specify the filter criteria and moved again to specify the further filter criteria.

14. A system comprising:
at least one processor; and
computer-executable instructions which, when executed by the at least one processor, cause the at least one processor to:
provide a user interface comprising a menu of reusable components encoding corresponding analytic patterns,
receive a first user input identifying a selected reusable component from the menu, wherein the selected reusable component encodes a selected analytic pattern corresponding to the selected reusable component, the selected analytic pattern comprising a mathematical operation,
receive a second user input specifying a data source of at least one data connector of the selected reusable component,
evaluate the selected analytic pattern comprising the mathematical operation on data from the specified data source to obtain a result,
receive a third user input specifying filter criteria to be applied to the data from the specified data source to obtain filtered data,
responsive to receipt of the third user input, automatically re-evaluate the selected analytic pattern comprising the mathematical operation on the filtered data to obtain a further result, and
automatically update the user interface to reflect the further result responsive to receipt of the third user input.

15. The system of claim 14, wherein the user interface comprises an adjustable control configured to receive the third user input.

16. The system of claim 14, wherein the result comprises multiple locations and the user interface comprises a map of the multiple locations.

17. The system of claim 16, wherein the further result comprises different locations than the multiple locations of the result.

18. The system of claim 17, wherein the computer-executable instructions further cause the at least one processor to:
responsive to receipt of the third user input, automatically update the map to show the different locations.

19. The system of claim 14, wherein the computer-executable instructions further cause the at least one processor to:
automatically update the user interface to show the filtered data responsive to receipt of the third user input.

20. The system of claim 14, wherein the computer-executable instructions further cause the at least one processor to:
apply the filter criteria to the data to obtain the filtered data; and
populate an input variable of an equation included in the selected analytic pattern to re-evaluate the selected analytic pattern, the equation comprising the mathematical operation.

* * * * *